United States Patent [19]
Kim et al.

[11] Patent Number: 6,104,753
[45] Date of Patent: Aug. 15, 2000

[54] DEVICE AND METHOD FOR DECODING HDTV VIDEO

[75] Inventors: Jin-Gyeong Kim; Hwa-Young Lyu, both of Seoul, Rep. of Korea

[73] Assignee: LG Electronics Inc., Rep. of Korea

[21] Appl. No.: 08/792,806

[22] Filed: Feb. 3, 1997

[30]     Foreign Application Priority Data

Feb. 3, 1996  [KR]   Rep. of Korea ..................... 96-2627

[51] Int. Cl.[7] ...................................... H04N 7/18
[52] U.S. Cl. ...................... 375/240; 348/390; 348/402; 348/403; 348/407
[58] Field of Search ..................... 348/388, 390, 348/396, 402, 403, 406, 407, 411, 415, 416, 420, 421, 443, 441, 553, 555, 437, 445, 452

[56]             References Cited

U.S. PATENT DOCUMENTS

| | | | |
|---|---|---|---|
| 5,412,428 | 5/1995 | Tahara ....................................... | 348/396 |
| 5,485,216 | 1/1996 | Lee .......................................... | 348/443 |
| 5,485,279 | 1/1996 | Yonemitsu et al. ....................... | 348/411 |
| 5,504,530 | 4/1996 | Obikane et al. .......................... | 348/413 |
| 5,519,446 | 5/1996 | Lee .......................................... | 348/402 |
| 5,574,565 | 11/1996 | Strolle et al. .............................. | 386/81 |
| 5,684,539 | 11/1997 | Boyce et al. ............................. | 348/420 |
| 5,708,732 | 1/1998 | Merhav et al. ........................... | 348/398 |
| 5,737,019 | 4/1998 | Kim ......................................... | 348/390 |
| 5,742,343 | 4/1998 | Haskell et al. ........................... | 348/415 |
| 5,754,238 | 5/1998 | Koyanagi et al. ........................ | 348/415 |
| 5,832,120 | 11/1998 | Prabhakar et al. ....................... | 382/233 |
| 5,832,124 | 11/1998 | Sato et al. ................................ | 348/409 |

*Primary Examiner*—Andy Rao

[57]             ABSTRACT

HDTV video decoder circuit is disclosed, which has an ¼ size frame memory for a progressive scanned or interlace scanned video and yet can conduct IDCT and motion compensation to fit to the reduced frame memory size, which, in comparison to a conventional MPEG-2 video decoder which uses a 4×4 IDCT that requires ¼ frame memory in encoding an interlace scanned image into frame picture only to lose field information of the image resulting in a significant damage to the picture quality, facilitates to maintain the field information as it was resulting in an improvement in the picture quality.

33 Claims, 21 Drawing Sheets

FIG.5
prior art

| | LSB 2bits of horz.MV | LSB 2bits of vert.MV | k1 | k2 | k3 | k4 |
|---|---|---|---|---|---|---|
| A | 0 0 | 0 0 | 1.00 | 0.00 | 0.00 | 0.00 |
| a | 0 1 | 0 0 | 0.75 | 0.25 | 0.00 | 0.00 |
| b | 1 0 | 0 0 | 0.50 | 0.50 | 0.00 | 0.00 |
| c | 1 1 | 0 0 | 0.25 | 0.75 | 0.00 | 0.00 |
| d | 0 0 | 0 1 | 0.75 | 0.00 | 0.25 | 0.00 |
| e | 0 1 | 0 1 | 0.56 | 0.19 | 0.19 | 0.06 |
| f | 1 0 | 0 1 | 0.31 | 0.31 | 0.19 | 0.19 |
| g | 1 1 | 0 1 | 0.19 | 0.56 | 0.06 | 0.19 |
| h | 0 0 | 1 0 | 0.50 | 0.00 | 0.50 | 0.00 |
| i | 0 1 | 1 0 | 0.31 | 0.19 | 0.31 | 0.19 |
| j | 1 0 | 1 0 | 0.25 | 0.25 | 0.25 | 0.25 |
| k | 1 1 | 1 0 | 0.19 | 0.31 | 0.19 | 0.31 |
| l | 0 0 | 1 1 | 0.25 | 0.00 | 0.75 | 0.00 |
| m | 0 1 | 1 1 | 0.19 | 0.06 | 0.56 | 0.19 |
| n | 1 0 | 1 1 | 0.19 | 0.19 | 0.31 | 0.31 |
| o | 1 1 | 1 1 | 0.06 | 0.19 | 0.19 | 0.56 | estimation : $k1 \times A + k2 \times B + k3 \times c + k4 \times D$

```
even fields
 0  ⊗     odd fields      ×
                0  ⊗           ×
 1  ×
                1  ×
 2  ⊗                       ×
                2  ⊗           ×
 3  ×
                3  ×  ⇒
 4  ⊗                       ×
                4  ⊗           ×
 5  ×
                5  ×
 6  ⊗                       ×
                6  ⊗           ×
 7  ×
                7  ×
```

(a) before decimation (b) after decimation

×: decoded luminance signal
△: decoded color signal
○: undecoded luminance signal
▽: undecoded color signal
☐: luminance signal output
⬡: color signal output

```
     even
 0    ⊗        odd              x
                0   x  ⎞
 1    x                x         x
                1   x  ⎠
 2    ⊗                          x
                2   x  ⎞
 3    x                x  ⇨      x
                3   x  ⎠
 4    ⊗                          x
                4   x  ⎞
 5    x                x         x
                5   x  ⎠
 6    ⊗                          x
```

```
0   x ——→ x   0
1   x
2   x ——→ x   1
3   x
4   x ——→ x   2
5   x
6   x ——→ x   3
7   x
``` reference frame   estimated frame

FIG. 27
|   |   |   | mv mod4 |
|---|---|---|---|
| A | ○ | a | 0 |
|   | x | b | 1 |
|   | x | c | 2 |
|   | x | d | 3 |
| B | ○ |   |   |
FIG. 28
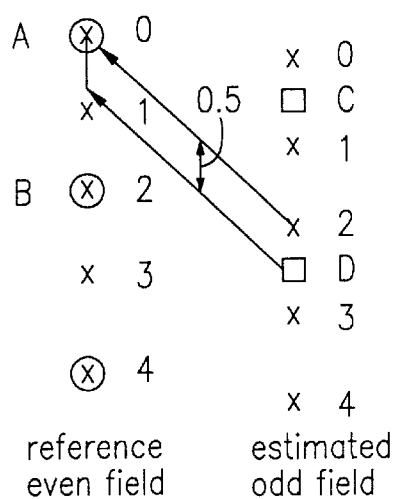
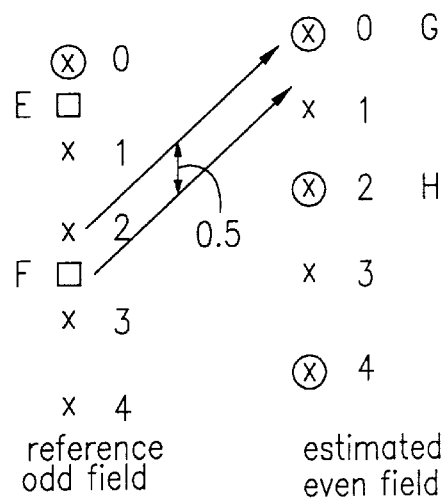

ⓧ : decoded even lines
x : undecoded even lines
□ : decoded odd lines

DEVICE AND METHOD FOR DECODING HDTV VIDEO

BACKGROUND OF THE INVENTION

1. Field of the Invention

The present invention relates to an HDTV video decoder and, more particularly, to an HDTV(High Definition TV) video decoder circuit having a ¼ size frame memory for a progressive scanned or interlace scanned video which is capable of conducting a IDCT(Inverse Discrete Cosine Transform) and motion compensation to fit to the reduced frame memory size.

2. Discussion of the Related Art

The GA(Grand Alliance) HDTV system, which is the U.S.A. HDTV standard, has video compression and multiplexing techniques following the MPEG-2(Moving Picture Experts Group-2) standards. It also has the capability for plural broadcasting video formats including with 24 Hz 30 Hz progressive scanning systems, and a 60 Hz interlaced scanning system for 1920×1080 pixels, and 24 Hz, 30 Hz and 60 Hz progressive scanning systems for 1280×720 pixels.

A conventional HDTV video decoding device will be explained with reference to the attached drawings.

FIG. 1 illustrates a block diagram of a conventional HDTV video decoder circuit for decoding video data of progressive or interlaced system.

Referring to FIG. 1, the conventional HDTV video decoder circuit includes a VLD(Variable Length Decoder)/demultiplexer 11 for variable length decoding and separating a received HDTV bit stream, an inverse quantizing part 12 for inverse quantizing a coefficient from the VLD/demultiplexer 11 according to a quantizing value, an IDCT part 13 for inverse discrete cosine transformation of the inverse quantized coefficient from the inverse quantizing part 12 to restore the bit stream into a video signal, an adding part 14 for converting the video signal from the IDCT part 13 into to a motion compensated video signal, a frame buffer 15 of 3M byte size for converting the video signal from the adding part into a frame unit video signal, a slice buffer 16 for presenting the video signal from the frame memory 15 in a line unit video signal, a frame buffer 17 of 6 M byte size for converting the video signal from the adding part 14 into a frame unit video signal and storing therein, and a motion compensating part 18 for motion compensation of the video signal from the frame buffer 17 according to an MV(Motion Vector) from the VLD/demultiplexer 11 and applying to the adding part 14.

The operation of the conventional HDTV video decoder circuit will be explained.

Referring to FIG. 1, upon reception of an HDTV bit stream, the VLD/demultiplexer 11 makes a variable length decoding of the bit stream and separates the bit stream into motion information, a quantizing value and at least one coefficient. The separated motion vector is applied to the motion compensating part 18, and the quantizing value and the coefficients are applied to the inverse quantizing part 12. The inverse quantizing part 12 inverse quantizes the coefficient from the VLD/demultiplexer 11 according to the quantizing value, and the inverse quantized coefficient is, restored into a video signal through an inverse DCT of 8×8 units in the IDCT part 13, and applied to the adding part 14. The adding part 14 adds the video signal from the IDCT part 13 to a signal predicted in the frame buffer 17 through the motion compensation in the motion compensating part 18 to restore a perfect image which is applies to the frame buffer 15. The frame buffer 15 converts the video signal from the adding part 14 into a frame unit video signal and which is applied to the slice buffer 16, and the slice buffer 16 converts the video signal from the frame buffer 15 into a line unit video signal which is thereafter presented as output. The video signal from the adding part 14 is converted into a frame unit video signal and stored in the frame buffer 17 of 6 M byte size, and the motion compensating part 18 makes a motion compensation of the video signal from the frame buffer 17 according to the motion vector from the VLD/demultiplexer 11 and applies the compensated video signal to the adding part 14.

In addition to the compression application, the DCT also has a video signal decimation application.

A decimated image that is proportional to, for example, a selected region of an N×N sized image can be obtained by performing a N×N discrete cosine transformation of the N×N sized image, selecting a region smaller than N and discarding the rest through a zonal filter, and conducting an inverse discrete cosine transformation suitable to the selected region. In this instant, an image decimated by ½ in vertical and horizontal directions can be obtained by using the zonal filter because the resolution of an NTSC image is ¼ the resolution of an HDTV image.

FIG. 2 illustrates a block diagram of the conventional HDTV video decoder circuit that is decimated by ½ in vertical and horizontal directions, and which will be explained herein after, omitting explanations on the identical parts to the parts shown in FIG. 1.

Referring to FIG. 2a the feature of this system is the zonal filter 20 provided between the VLD/demultiplexer 19 and inverse quantizing part 21 of the system shown in FIG. 1, for selecting a quantizing value and a coefficient of a region corresponding to ¼ of a macro block size among the quantizing values and coefficients from the VLD/demultiplexer 19. The IDCT part 22 in FIG. 2 conducts an inverse discrete cosine transformation of the quantized coefficient from the inverse quantizing part 21 in 4×4 pixel units, to restore a video signal. Accordingly, the received HDTV bit stream is finally presented as a video signal decimated by ½ in horizontal and vertical directions, i.e., a video signal decimated by ¼ size.

The operation of the system shown in FIG. 2 will be explained with reference to FIGS. 3~5 in detail. FIG. 3 illustrates an operational state of the zonal filter shown in FIG. 2, and FIG. 4 illustrates an array of pixels for explaining an interpolation of ¼ PEL resolution level using a motion vector.

A received HDTV bit stream is subjected to variable length decoding in the VLD/demultiplexer 19, from which motion vectors are applied to the motion compensating part 27, and quantizing values and coefficients are applied to the zonal filter 20. The received quantizing values and coefficients are filtered in the zonal filter 20; of the received quantizing values and coefficients, the quantizing values and coefficients in a region corresponding to a 4×4 pixel size are selected as shown in FIG. 3. Therefore, the zonal filter 20 has a macro block buffer corresponding to the 4×4 pixel size. That is, as shown in FIG. 3, the zonal filter 20 selects coefficients only from the 4 ×4 region of the coefficients received from the VI.D/demultiplexer 19 and applies to the inverse quantizing part 21. Accordingly, a production rate of the inverse quantizing part 21 is reduced to ¼ and an IDCT unit of the IDCT part 22 is also changed to 4×4. Thus, the coefficients from the zonal filter 20 are inverse quantized in the inverse quantizing part 21 according to a quantizing value, and the quantized coefficients from the quantizing part 21 is inverse discrete cosine transformed in the IDCT part 22, to be restored as a perfect video signal.

In this time, since the IDCT unit is changed to 4×4 unit, the function of the IDCT part 22 should also be changed as follows,

8×8 IDCT:

$$F(u, v) = \frac{2}{8} C(u)C(v) \sum_{x=0}^{7} \sum_{y=0}^{7} f(x, y) \cos\frac{(2x+1)u\pi}{16} \cos\frac{(2y+1)v\pi}{16}$$

4×4 IDCT:

$$f(u, v) = \frac{2}{8} \sum_{u=0}^{3} \sum_{v=0}^{3} C(u)C(v)F(u, v) \cos\frac{(4x+1)u\pi}{16} \cos\frac{(4y+1)v\pi}{16}$$

where $C(u)$ and $C(v) = \begin{cases} \frac{1}{\sqrt{2}}; u, v = 0 \\ 1; \text{the rest.} \end{cases}$ Therefore, the number of operations required the 4×4 IDCT part 22 implementation is reduced by a factor of approximately 1/16. And, a capacity of the frame memory required for the motion compensating part 27 and the frame buffer 26 is also reduced by a factor of ¼. Accordingly, a volume of hardware required for implementation of such a video decoder is reduced to about below ¼ in overall.

In the meantime, the video signal from the IDCT part 22 is added in the adding part 23 to the video signal motion compensated in the motion compensating part 27, and the video signal from the adding part 23 is, converted into a frame unit video signal in the frame buffer 24 and into a line unit video signal in the slice buffer 25, and finally presented. The video signal from the adding part 23 is stored in the frame buffer 26 in frame units for motion compensation; it is then applied to the motion compensating part 27. In this case, in the MPEG-2 video compression standard, a half-pet resolution level is applied to the interpolation in the motion compensation for improving correlation. That is, a motion vector transmitted through a channel is of the half-pel resolution. Accordingly, when of implementing a decoder in which the zonal filter 20 only selects a 4×4 region of 8×8 blocks to produce an image decimated by ½ in horizontal and vertical directions respectively, a motion compensation of an interpolation to a quarter pel resolution in horizontal and vertical directions respectively are applied based on the received half-pel resolution motion vector for substantially reducing errors occurred in the motion compensation, which has been verified through a mock test. FIGS. 4 and 5 illustrate examples of such interpolation techniques for motion compensation. That is, of received horizontal and vertical 6 bit motion information, each of 2 least significant bits contains information which can interpolate up to ¼ pel resolution, and specific interpolating methods using the information are shown in FIGS. 4 and 5.

However, though the conventional HDTV video decoder can effectively decode a bit stream of a progressive scanned image compressed according to the MPEG-2 standard, and having a frame that is composed of pixels formed at the same time, the conventional HDTV video decoder experiences severe errors when decoding an interlace scanned image having a frame that is composed of two fields of different time bases. That is, though there is no problem in decoding a progressive scanned image or interlace scanned image into a field picture if a vertical direction decimation is conducted applying a vertical direction ½ zonal filtering and a 4×4 IDCT, in case the picture quality suffers from vital damage because of loss of time information when decoding mixed images of two times bases within a frame, like the case of decoding an interlace scanned image into a frame picture. As this vertical decimation is not practicable, an 8×4 IDCT and a frame memory reduced by ½ in a horizontal direction are used, which results in increased costs.

SUMMARY-OF THE INVENTION

Accordingly, the present invention is directed to device and method for decoding an HDTV video that substantially obviates one or more of the problems due to limitations and disadvantages of the related art.

An object of the present invention is to provide a device for decoding an HDTV video, in which a frame memory capacity for all the bit streams of progressive scanned image and interlace scanned image encoded to the MPEG-2 is reduced by ½ in horizontal and vertical directions and conducts an IDCT and motion compensation to suit to the reduced frame memory size, and still allows to obtain a good picture quality.

Another object of the present invention is to provide a method corresponding to the aforementioned device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for decoding an HDTV video includes horizontal decimating means for analyzing a motion vector and a coded structure of an image from a received video signal and decimating the video signal in a horizontal direction, vertical decimating means for receiving the analyzed coded structure of the image and decimating the image restored by the horizontal direction decimation in the horizontal decimating means in a vertical direction according to the analyzed coded structure of the image, means for receiving the motion vector and correcting the received motion vector based on the analyzed coded structure of the image, and a restoring means for conducting a motion compensation of the horizontally and vertically decimated image using the corrected motion vector to restore an original image.

In another aspect of the present invention, there is provided an HDTV video decoder circuit including a VLD/demultiplexer for conducting a variable length decoding of a received bit stream to separate motion vectors, quantizing values, and 8×8 DCT coefficients, an 8×4 zonal filter for removing horizontal high frequency regions from the quantizing values and the 8×8 DCT coefficients received from the VLD/demultiplexer, an inverse quantizing part for quantizing the 8×4 DCT coefficients from the zonal filter according to the quantizing values, an IDCT part for conducting an 8×4 IDCT of the quantized coefficients from the inverse quantizing part to restore a video signal, an adaptive vertical decimating part for decimating an odd field of an interlace scanned image signal with the odd field matched to a display line position to produce 4×4 pixels per block in a vertical decimation of the IDC transformed 8×4 pixels from the IDCT part according to a DCT type and a progressive frame value, a motion vector correcting part for correcting the motion vector from the VLD/demultiplexer according to the motion vector value and progressive_frame value, a motion compensating part for conducting a motion compensation of 8×8 reference macro blocks to match to the blocks reduced by the motion vector corrected in the motion vector correcting part, an adding part for adding the 8×8 macro blocks composed of 4 blocks from the adaptive vertical decimating part and the 8×8 reference macro blocks motion compensated in the motion compensating part to restore 8×8 macro blocks, a frame memory for converting the video signal decimated by ½ in horizontal and vertical directions respectively in the adding part into a frame unit video signal according to B, I, P picture types and storing therein, and a multiplexer for selecting an output from the adding part if it is a B picture, and selecting the video signal from the frame memory if it is I or P picture.

In further aspect of the present invention, there is provided a method for decoding an HDTV video including the steps of analyzing a motion vector and a coded structure of a received video signal, and decimating the video signal in a horizontal direction with reference to the analysis to restore the video signal, determining an image of having been decimated in a vertical direction and decimating the image in the vertical direction with reference to the analyzed coded structure, correcting a received motion vector value with reference to the motion vector and the analyzed coded structure of a video, and conducting a motion compensation using the horizontally/vertically decimated video and a respective motion vector value to restore an original image finally.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings:

In the drawings:

FIG. 5 shows a table for explaining an interpolation of ¼ pel resolution level using a motion vector;

FIG. 6 illustrates a process for vertical decimation of macro blocks of a progressive scanned image in an HDTV video decoder in accordance with a preferred embodiment of the present invention;

FIG. 7 illustrates a process for vertical decimation of macro blocks of an interlace scanned image in an HDTV video decoder in accordance with a preferred embodiment of the present invention;

FIG. 20 illustrates a process of vertical decimation of macro blocks of a progressive scanned video in the circuit shown in FIG. 19;

FIG. 21 illustrates a process of vertical decimation of macro blocks of an interlace scanned video in the circuit shown in FIG. 19;

FIG. 27 illustrates vertical interpolation points according to the motion vectors shown in FIG. 26;

FIG. 28 illustrates a process of motion compensation of the interlace scanned field in view of pixels in the circuit shown in FIG. 19;

DETAILED DESCRIPTION OF THE PREFERRED EMBODIMENTS

Reference will now be made in detail to the preferred embodiments of the present invention, examples of which are illustrated in the accompanying drawings.

Figure 1:
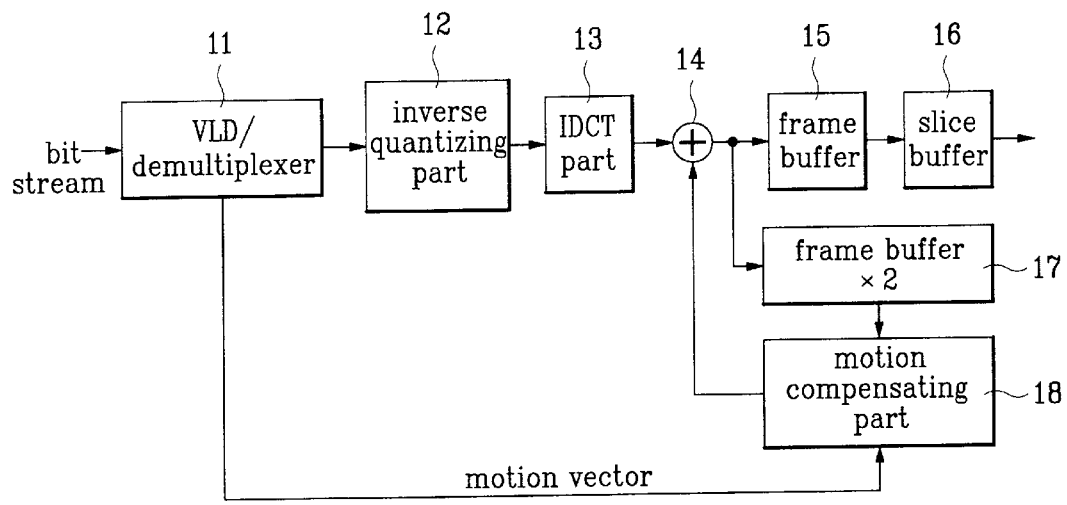
FIG. 1 illustrates a block diagram of a conventional HDTV video decoder circuit.
Figure 2:
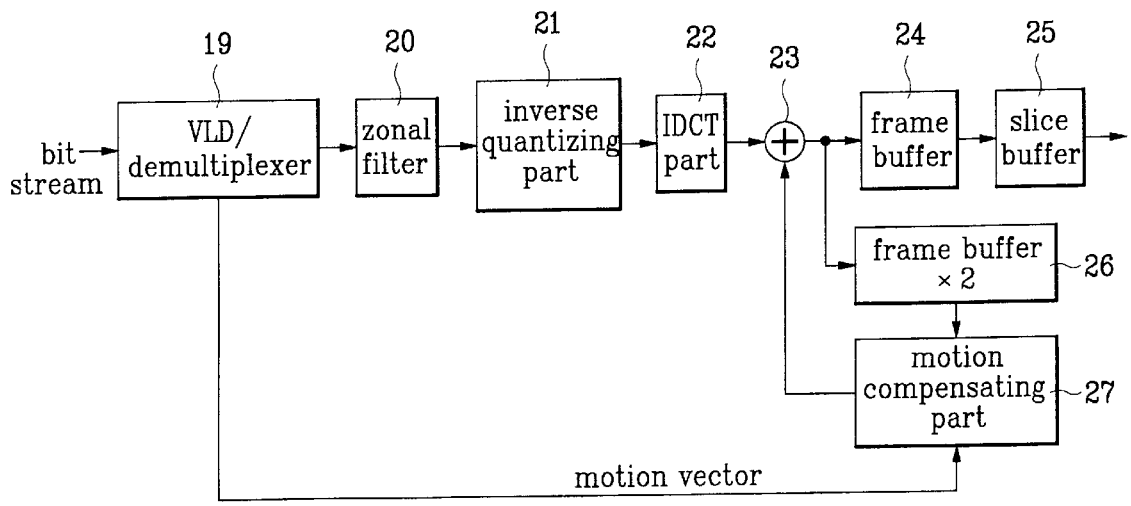
FIG. 2 illustrates a block diagram of a conventional HDTV video decoder circuit decimated by ½ in horizontal and vertical directions, respectively.
Figure 3:
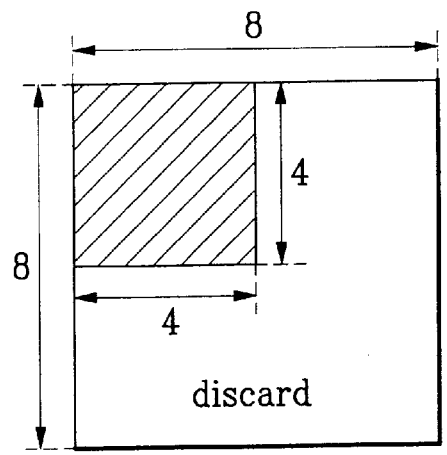
FIG. 3 illustrates an operational state of the zonal filter shown in FIG. 2.
Figure 4:
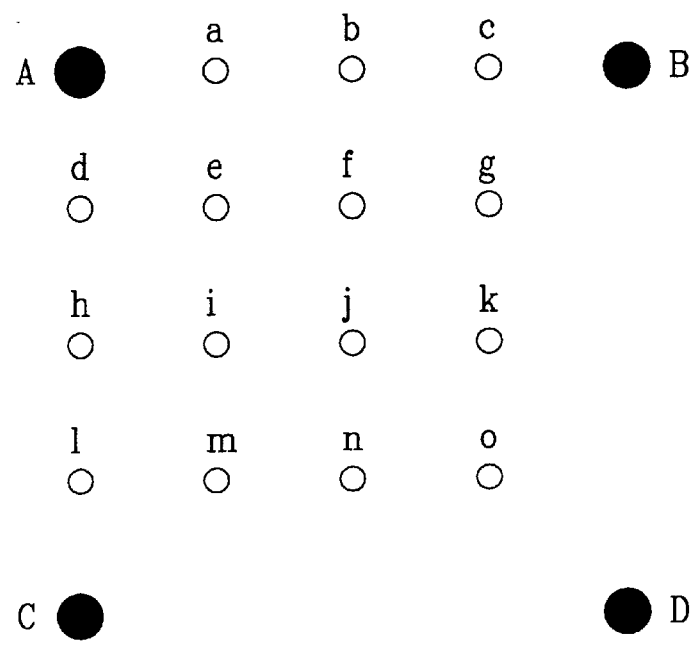
FIG. 4 shows an array of pixels for explaining an interpolation of ¼ pel resolution level using a motion vector.
Figure 8A:
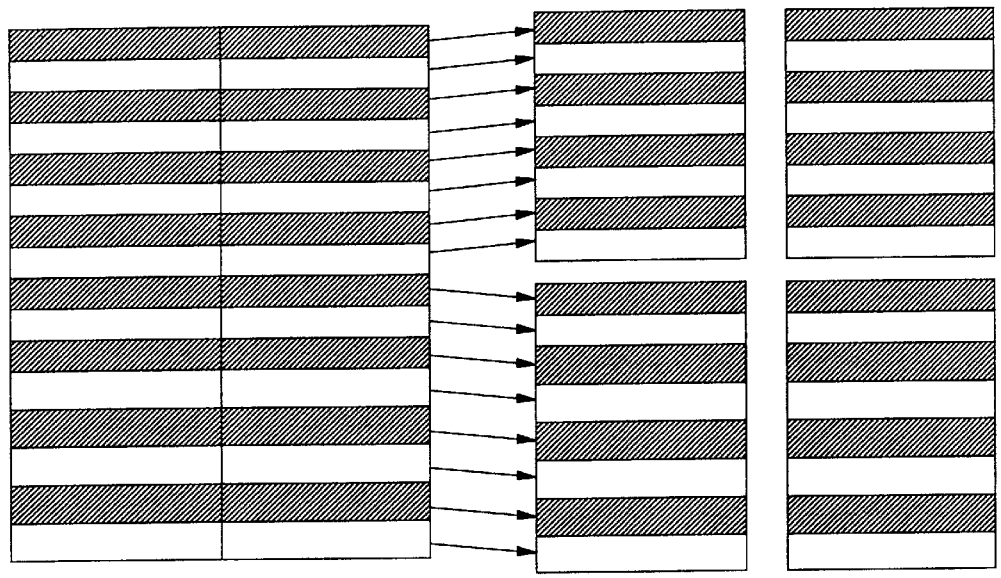
FIGS. 8a and 8b illustrate structures of macro blocks according to discrete cosine transformation types in an HDTV video decoder in accordance with a preferred embodiment of the present invention.
Figure 8B:
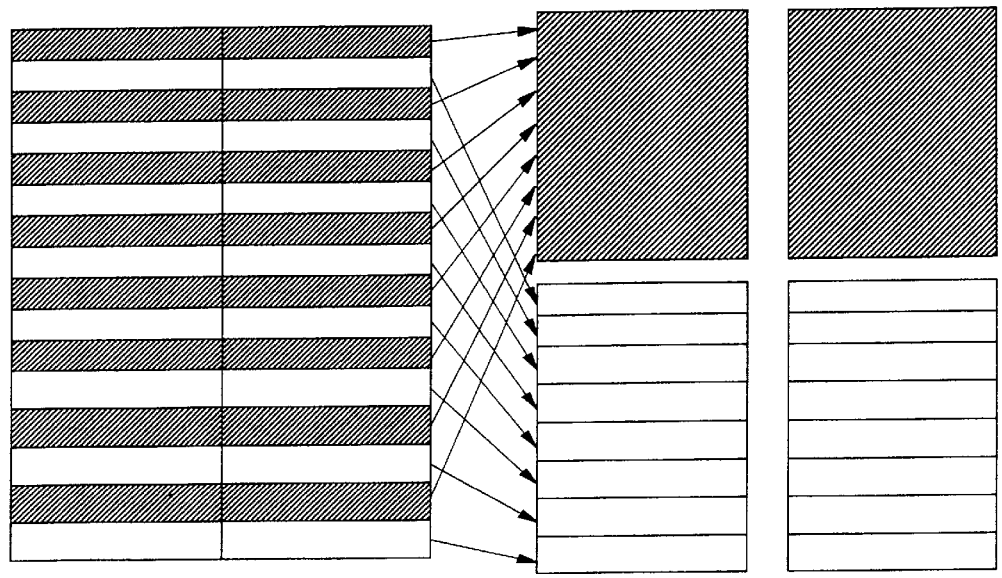

An object of the present invention involves on decoding a video bit stream encoded to the MPEG-2 even after reducing a required memory size to ¼. Accordingly, unlike the conventional technique, the horizontal ½ decimation is conducted by a motion compensation of ¼ half-pel resolution using a horizontal ½ zonal filtering, 8×4 IDCT, and a scaled down motion vector. However, the vertical decimation is processed differently depending on whether in a bit stream an encoded progressive scanned picture or encoded interlace scanned picture. To reduce a frame memory, a decoded image is decimated by ½ in horizontal and vertical directions respectively. Since the video data stored in the frame memory is used for restoring the next image, the video data should be stored to suit to the nature of the image. Accordingly, as shown in FIG. 6, a progressive scanned image is decimated in a vertical direction, in which positions of decimated lines correspond to even line positions. And, for decoding an interlace scanned image, the even field and the odd field should be decimated independently. As shown in FIG. 7, decimated positions in this case correspond to even line positions for each of the even field and the odd field. In the meantime, a macro block(MB) for a general MPEG-2 decoder has 16×16 pixels, in which luminance signal is discrete cosine transformed either with a frame DCT method, as shown in FIG. 8*a* or with a field DCT method, as shown in FIG. 8*b*. As shown in FIG. 8*a*, the frame DCT method includes the steps of slicing the macro block into four blocks and conducting a DCT for each of the 8×8 blocks, and, as shown in FIG. 8*b*, the field DCT method includes the steps of separating the macro block by fields, slicing each of the fields into two, and conducting a DCT of each of the sliced fields.

The device for decoding an HDTV video in accordance with the present invention will be explained by preferred embodiments with reference to the attached drawings.

FIRST EMBODIMENT

Figure 9:
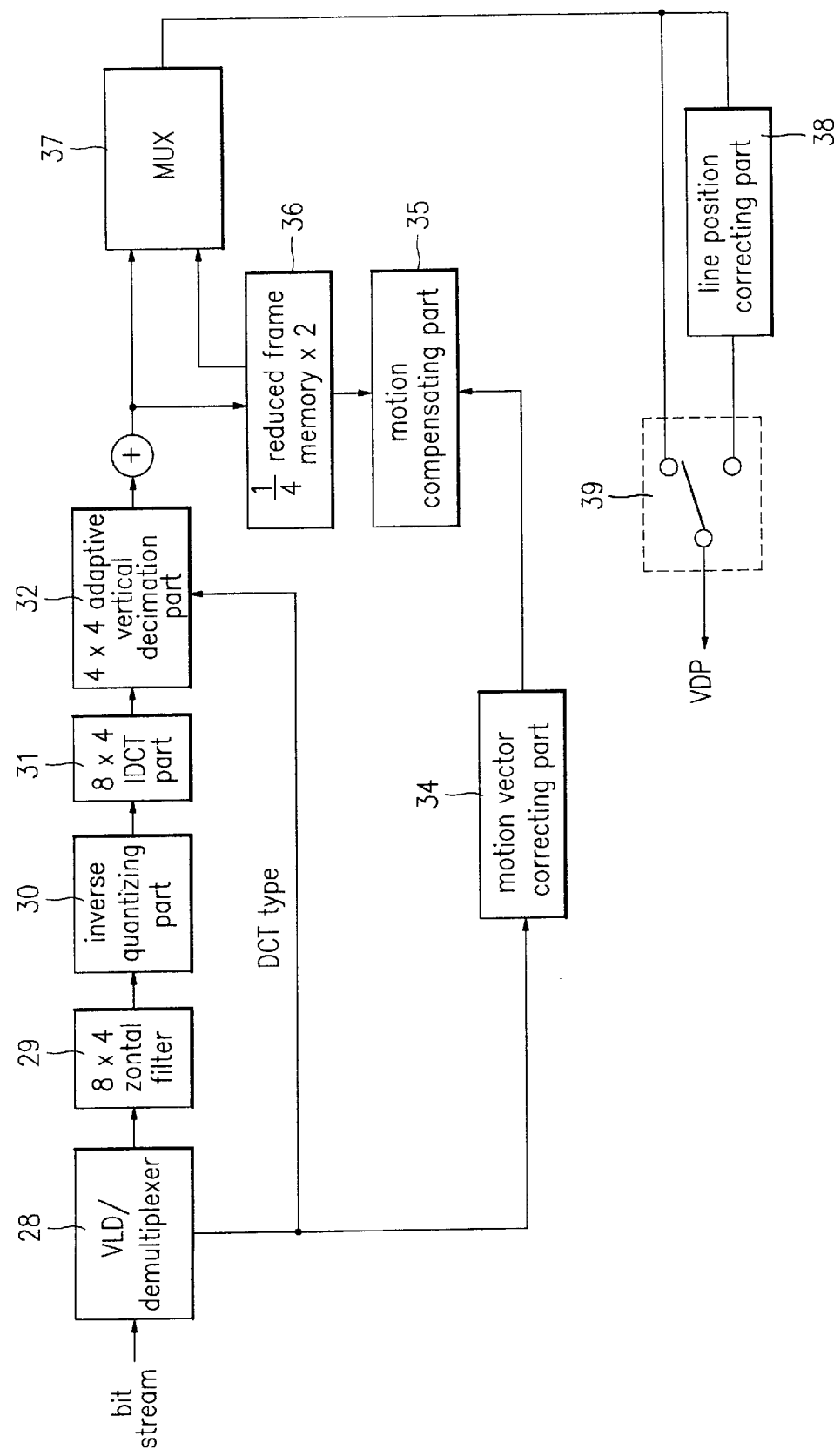
FIG. 9 illustrates a block diagram of an HDTV video decoder circuit in accordance with a first embodiment of the present invention.

FIG. 9 illustrates a block diagram of an HDTV video decoder circuit in accordance with a first embodiment of the present invention which can decimate an interlace scanned image having a frame with two fields of different time bases without losing its time information and which can conduct a compensation suited to the time information, thereby improving a picture quality of the decimated image.

Referring to FIG. 9, the HDTV video decoder circuit in accordance with a first embodiment of the present invention includes a VLD/demultiplexer 28 for conducting a variable length decoding of a received bit stream to separate the bit stream into motion vectors, quantizing values, and 8×8 DCT coefficients, an 8×4 zonal filter 29 for removing horizontal high frequency regions from the quantizing values and the 8×8 DCT coefficients received from the VLD/demultiplexer 28, an inverse quantizing part 30 for quantizing the 8×4 DCT coefficients from the zonal filter 29 according to the quantizing values, an IDCT part 31 for conducting an 8×4 IDCT of the quantized coefficients from the inverse quantizing part 30 to restore a video signal, an adaptive vertical decimating part 32 for vertical ½ decimation of the IDCT transformed 8×4 pixels from the IDCT part 31 according to a DCT type to produce 4×4 pixels per block, a motion vector correcting part 34 for correcting the motion vector from the VLD/demultiplexer 28 according to a motion type, a motion compensating part 35 for conducting a motion compensation to match to the blocks reduced by the motion vector corrected in the motion vector correcting part 34 to produce 8×8 reference macro blocks, an adding part 33 for adding the 8×8 macro blocks composed of 4 blocks from the adaptive vertical decimating part 32 and the 8×8 reference macro blocks motion compensated in the motion compensating part 35 to restore to 8×8 macro blocks, a frame memory 36 for converting the video signal from the adding part 33 into a frame unit video signal according to B, I, P picture types and storing therein, a multiplexer 37 for selecting one from the video signals from the adding part 33 and the frame memory 36 depending on the B, I, P picture types, a line position correcting part 38 for correcting a line position as an odd field of the video signal from the multiplexer 37, and a switching part 39 for selecting an output from the multiplexer 37 if the decoding picture is a progressive scanned image and selecting an output from the line position correcting part 38 if the decoding picture is an interlace scanned image, and presenting to a VDP.

The operation of the aforementioned HDTV video decoder circuit in accordance with a first embodiment of the present invention will be explained.

Figure 10:
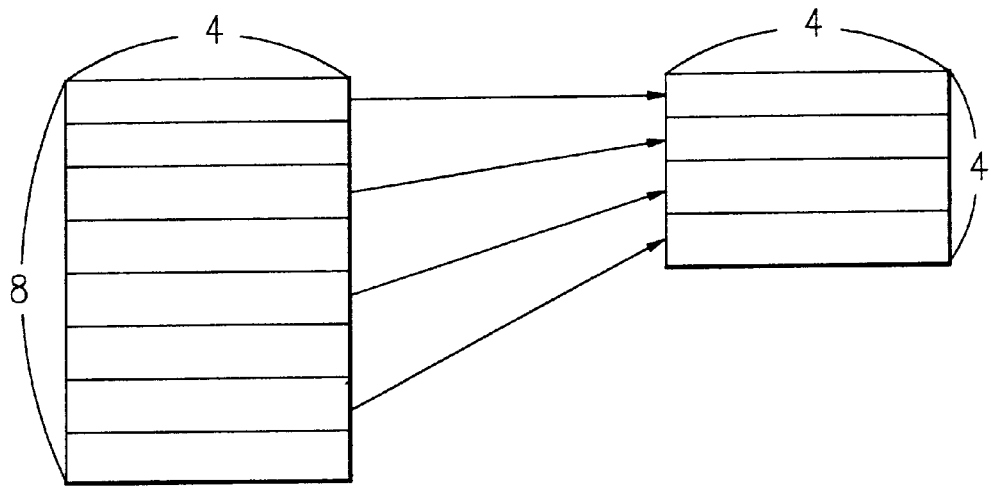
FIG. 10 illustrates a process for vertical decimation of odd lines in the circuit shown in FIG. 9.
Figure 11:
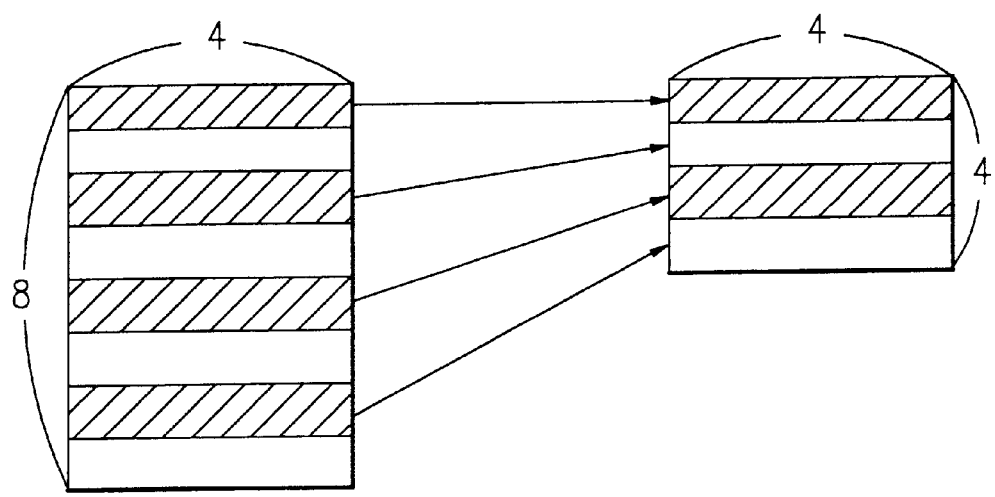
FIG. 11 illustrates a process of vertical decimation after separation of even/odd fields in the circuit shown in FIG. 9.

A received HDTV bit stream is variable length decoded in the VLD/demultiplexer 28, of which resultant motion vectors are applied to the motion vector correcting part 34 and quantizing values and 8×8 DCT coefficients are removed from horizontal high frequency regions in the zonal filter 29 and selected of quantizing values and coefficients corresponding to an 8×4 pixel size. Therefore, the zonal filter 29 is composed of a macro block buffer of 8×4 pixel size. The zonal filter 29 removes the horizontal high frequency regions, but not vertical high frequency regions, in order to restore the even, and odd fields, exactly. Therefore, of the 8×8 DCT coefficients from the VLD/demultiplexer 28, the zonal filter 29 only selects coefficients for a 8×4 region and applies to the inverse quantizing part 30. Accordingly, a quantizing rate of the inverse quantizing part 30 is reduced to ½, and an IDCT unit of the IDCT part 31 changes to 8×4. That is, the coefficients from the zonal filter 29 are quantized in the inverse quantizing part 30 according to the quantizing values, and 8×4 inverse discrete cosine transformed in the IDCT part 31, for being restored into a video signal. The 8×4 pixels IDC transformed in the IDCT part 31 is vertically decimated by ½ in the adaptive vertical decimating part 32 according to a DCT type to produce 4×4 pixels per block. That is, upon reception of a horizontally ½ decimated block, the adaptive vertical decimating part 32 vertically decimates differently depending on DCT types, picture structures, progressive_frames and component indices. As shown in FIGS. 8*a* and 8*b*, there are frame DCTs and field DCTs in the DCT types, and there are field pictures in which even or odd fields compose a picture and frame pictures in which even, and odd fields together compose a picture in the picture structure. Therefore, in a decimation, the adaptive vertical decimating part 32 removes data on even line positions, as shown in FIG. 10, or data on pairs of even and odd fields after dividing a picture into even and odd fields as shown in FIG. 11 depending on DCT types, picture structures, progressive frames and component indices. The decimation shown in FIG. 10 is used when no division into even and odd fields is required, and the decimation shown in FIG. 11 is used when the DCT coefficients is a mix of even and odd coefficients to require a classification. The method of decimation whether to decimate by removing the data on the even lines, as shown in FIG. 10, or to decimate by removing pairs of even and odd fields after division into even and odd fields in advance, is determined based on different decoded parameters as shown in FIG. 12.

Figure 12:
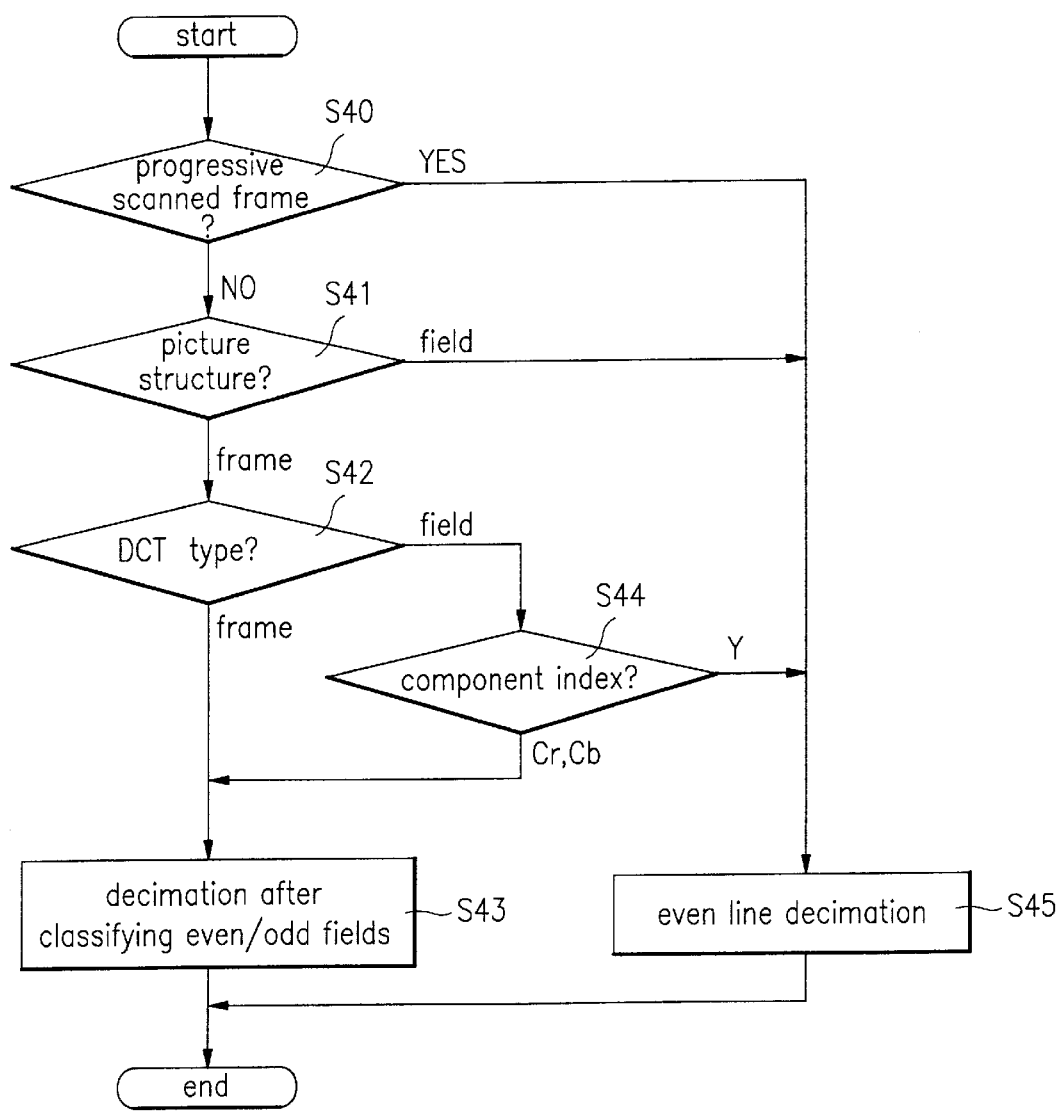
FIG. 12 illustrates a flow chart showing a process of an adaptive vertical decimation in the circuit shown in FIG. 9.

FIG. 12 illustrates a flow chart showing an operation of the adaptive vertical decimating part 32.

Referring to FIG. 12, in the S40 step, a progressive_frame is determined of being '1' or '0'. If the progressive_frame is '1', the image is a progressive scanned image, if the progressive_frame is '0', the image is an interlace scanned image. If the progressive_frame is '1', there is no separate even fields and odd fields because it is a progressive scanned image. Therefore, as the image will have a frame structure as shown in FIG. 6, the adaptive vertical decimating part 32 removes data on even line positions from the data received from the IDCT part 31 to decimate the image by ½ in a vertical direction(S45).

In the meantime, if the progressive_frame is determined to be '0' in the S40 step, as it indicates that the image is an interlace scanned image, which has a frame structure as shown in FIG. 7, the image should be decimated with the even fields and odd fields classified, without confusing the fields. Therefore, if the image is determined to be an interlace scanned image in the S40 step, a picture structure of the image should be determined. That is, since a picture structure of an interlace scanned image is either a frame picture in which an odd line is an odd field and an even line is an even field, or a field picture in which an even filed and an odd field are formed separate, in case of a bit stream composed of a field picture in which even fields and odd fields should not be mixed, if the picture structure is determined to be a field picture in the step S41, the adaptive vertical decimating part 32 removes data on even line positions from the data from the IDCT part 31 to decimate by ½ in a vertical direction as shown in FIG. 10(S45).

On the other hand, if the picture structure is determined to be a frame picture in the step S41, a DCT type of the picture is determined in the step S42. If the DCT type is determined to be a frame DCT in the step S42, the mixed even/odd lines are classified into even/odd fields as shown in FIG. 11 and removes data on even line positions from each of the classified fields to decimate the data in a vertical direction by ½.

In the meantime, if the DCT type is determined to be a field DCT in which odd, and even fields are coded separately, the picture is determined of being a luminance or color signal in a step S43. If the DCT type is a field DCT and the picture is a luminance signal, the adaptive vertical decimating part 32 removes data on even line positions from the data from the IDCT part 31 to decimate in the vertical direction by ½ as shown in FIG. 110(step S45). However, if the picture is determined to be a color signal in the step S44, since the color signal is IDC transformed with the odd/even fields mixed, the even/odd fields are classified as shown in FIG. 11, and each of the classified fields is removed of its data on even line positions to decimate the picture in the vertical direction by ½. That is, if the picture structure is a field picture while being a progressive scanned image or an interlace scanned image, or the picture structure is a frame picture while being an interlace scanned image and the DCT type is of field while the picture is luminance, data on even line positions are removed. And, the picture structure is a frame picture while being an interlace scanned image and DCT type is of frame, or DCT type is of field and picture is of color difference signal, even/odd fields are classified and data on even line positions are removed, to decimate the picture in vertical direction by ½.

Figure 13:
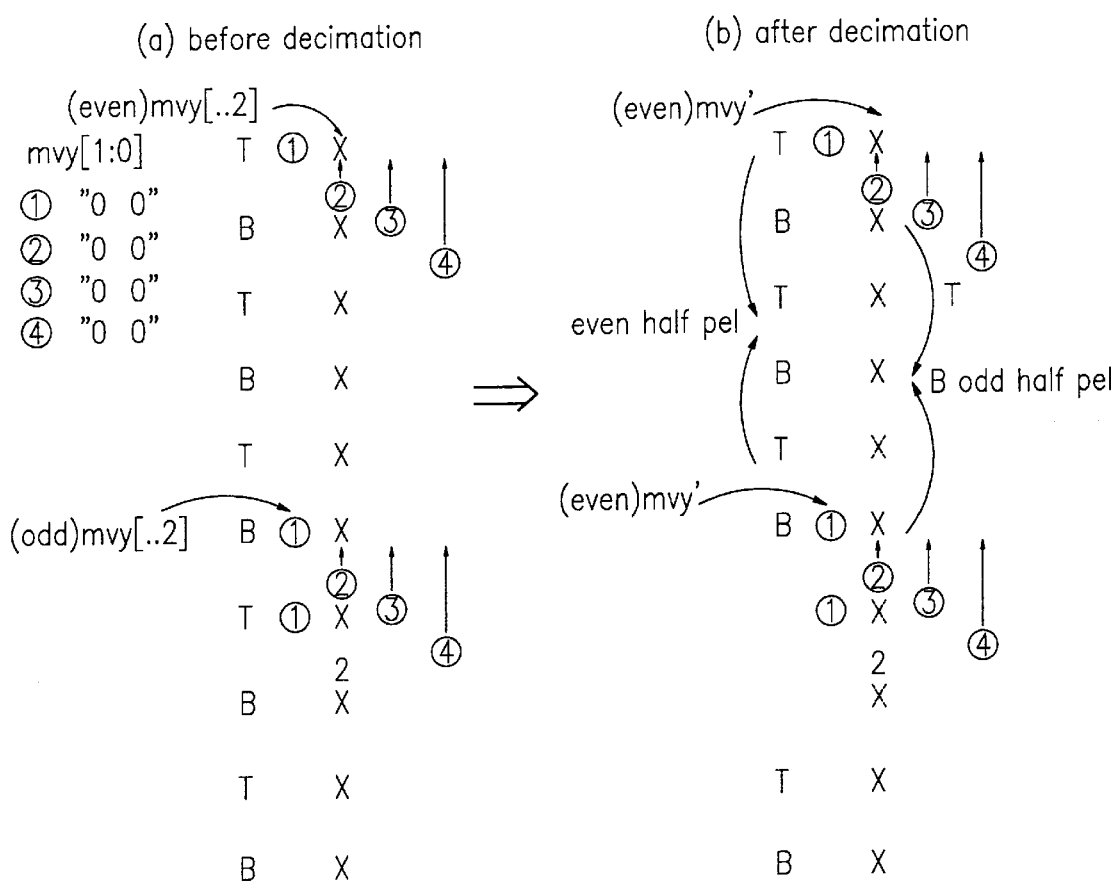
FIG. 13 illustrates a first embodiment of vertical direction pixels and motion vector positions for a motion compensation in the circuit shown in FIG. 9.

In the meantime, a reference unit of the motion compensation in an MPEG-2 video decoder is, 16×16 macro blocks in case of a luminance signal, and 8×8 macro blocks in case of a color difference signal. However, the received bit stream was decimated by ½ in horizontal and vertical direction respectively through the VLD/demultiplexer 28, zonal filter 29, inverse quantizing part 30, IDCT 31, and adaptive vertical decimating part 32, the reference unit of the motion compensation will be reduced to 8×8 in case of the luminance signal, and 4×4 in case of the color difference signal. Accordingly, a correction in the motion compensation method, such as correction of the motion vector is required. Particularly, in case an interlace scanned image is coded into a frame picture as shown in FIG. 11, in which the image is decimated in the vertical direction by ½ in field units lest the information between fields is lost, in case of a frame motion compensation, a vertical frame motion vector should be converted into a field motion vector and the motion compensation should be conducted in field units. Accordingly, the motion compensation of the motion vector compensating part 34 for each case and the subsequent operation of the motion compensating part 35 will be explained with reference to FIGS. 13~16, in detail. First, the vertical motion compensation will be explained.

i) Frame Motion Compensation of an Interlace Scanned Image Coded Into a Frame Picture Relative positions of vertical pels and motion vectors before and after a decimation are shown in FIG. 13.

Referring to FIG. 13, since an original image is an interlace scanned image, in case the picture was decimated in a vertical direction by ½ in field units lest the field information is lost, a frame vertical motion vector mvy is converted into a field motion vector mvy', a motion of the picture is classified in field units, and a field motion compensation of the picture is conducted. In this instant, when a frame vertical motion vector is mvy(half pel resolution) and a new field motion vector after decimation is mvy'=mvy [-2](half pel resolution), the mvy[1:0] motion vector is corrected as shown in [TABLE 1] and [TABLE 2] according to a field of which motion is to be estimated at the present time.

[TABLE 1] shows a process for converting a frame motion vector into an even field motion vector, and [TABLE 2] shows a process for converting the frame motion vector into an odd field motion vector.

That is, since, in [TABLE 1], if a frame vertical motion vector mvy is 00 and 10, a decoded motion vector is of pixel units, and if the frame vertical motion vector mvy is 01 and 11, the decoded motion vector is of half pel units. Therefore, in case the frame vertical motion vector is to be converted into an even field vertical motion vector, if the frame vertical motion vector mvy is 00, as the frame fields are the identical even lines, the even field vertical motion vector value is the even line value on the same position in the frame without any motion vector correction. And, if the frame vertical motion vector mvy is 10, a decimated field motion vector value is the odd line value next to the even line in the frame. That is, if an odd line value becomes an even field value, in order to correct the changed addresses of the odd line and the even field, the line is changed. Since a decoded motion vector is of half pel units if the frame vertical motion vector mvy is 01 and 10, the even field vertical motion vector is a value obtained by interpolating an even line value and an odd line value. Therefore, as even fields and odd fields are mixed and no classification is required, when the motion vector is 01, the decimated field motion vector is an average of an even line value and the next odd line value, when the motion vector is 11, the decimated field motion vector is an average of an odd line value and the next even line value.

TABLE 1

EVEN FIELD

| mvy[1:0] | motion compensated macro block |
|---|---|
| 0 0 | P{mvy'(even number)} |
| 0 1 | {P(mvy'(even number)) + P(mvy'(odd number))}/2 |
| 1 0 | P{mvy'(odd number)} |
| 1 1 | {P(mvy'(odd number)) + P(mvy' + 1)(even number))}/2 |

On the other hand, the process for converting the frame vertical motion vector into an odd field vertical motion vector is the same with the process for converting the frame vertical motion vector into the even field vertical motion vector. That is, as shown in [TABLE 2], if the motion vector is 00, a value in the same field, for example, an odd line value is taken, if the motion vector is 01 and 11, which is of half pel, an average of adjoining lines are taken, and if the motion vector is 10, the next line in the frame is taken, in correction of the motion vector.

TABLE 1

ODD FIELD

Figure 14:
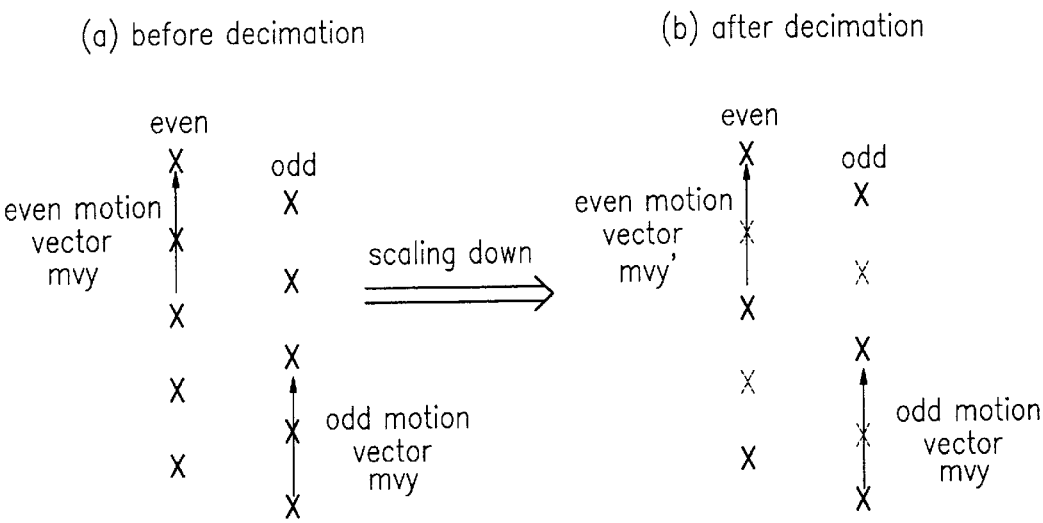
FIG. 14 illustrates a second embodiment of vertical direction pixels and motion vector positions for a motion compensation in the circuit shown in FIG. 9.

| mvy[1:0] | motion compensated macro block |
| --- | --- |
| 0 0 | P{mvy'(odd number)} |
| 0 1 | {P(mvy'(odd number)) + P(mvy' + 1)(even number))}/2 |
| 1 0 | P{mvy' + 1)(even number)} |
| 1 1 | {P(mvy' + 1)(even number)) + P(mvy' + 1)(odd number))}/2 | ii)-Motion Compensation of an Interlace Scanned Image Encoded Into a Frame Picture Relative positions of vertical pels and motion vectors before and after decimation are shown in FIG. 14. Since the motion compensation of this case is a field motion compensation in which field information is conserved as it was, the correction is done by scaling down the motion vector mvy by ½, i.e., mvy'=mvy/2.

TABLE 3

| | vertical field selecting signal | vertical field motion vector |
| --- | --- | --- |
| before decimation | mvfs = (0: even number, 1: odd number) | mvy'(half pel resolution) |
| after decimation | mvfs | mvy' + mvy/2(¼ pel res.) | where, the mvfs is a motion vector vertical field selecting signal, and the motion compensated macro block data (P(mvy'(mvfs))) is the macro block data at a half pel resolution mvy' position in a field selected in response to the mvfs signal.

iii)A Progressive Scanned Image Encoded Into a Frame Picture.

Figure 15:
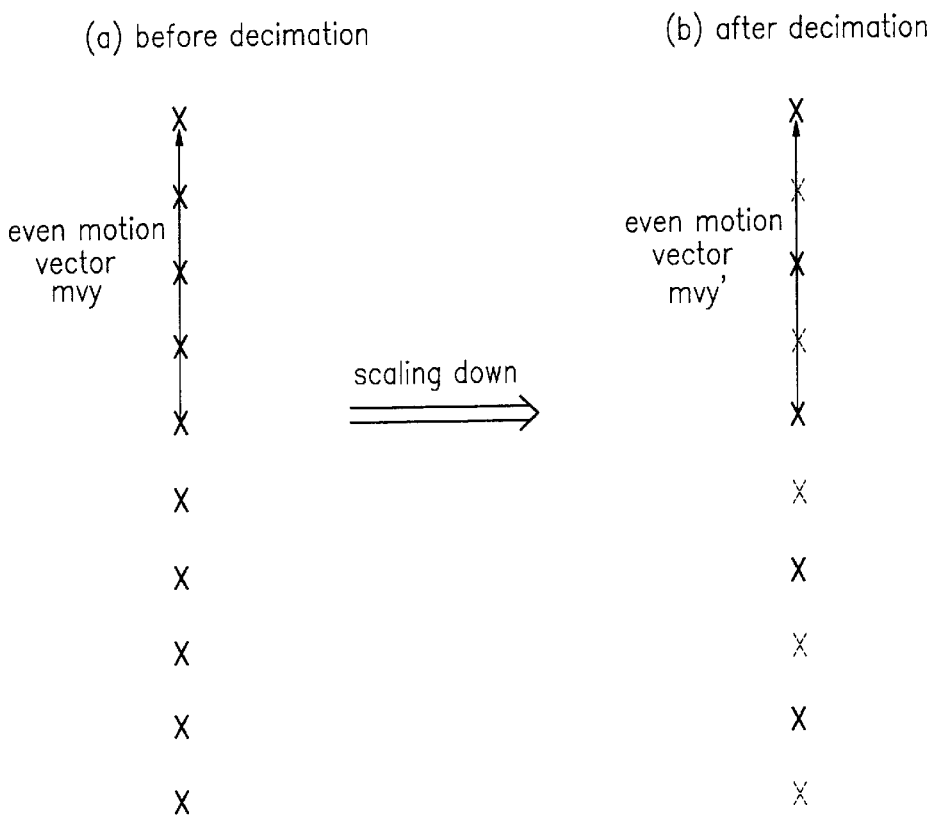
FIG. 15 illustrates a third embodiment of vertical direction pixels and motion vector positions for a motion compensation in the circuit shown in FIG. 9.
Figure 16:
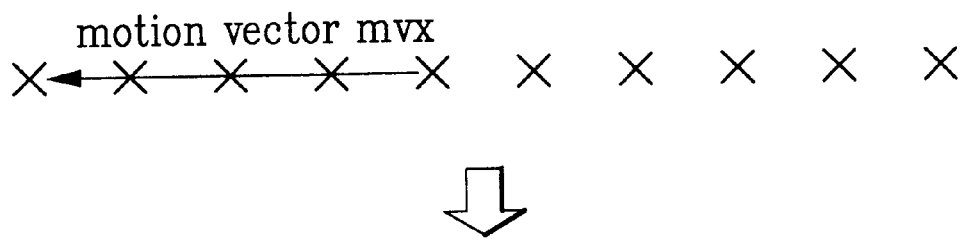
FIG. 16 illustrates horizontal direction pixels and motion vector positions for a motion compensation in the circuit shown in FIG. 9.
Figure 16:
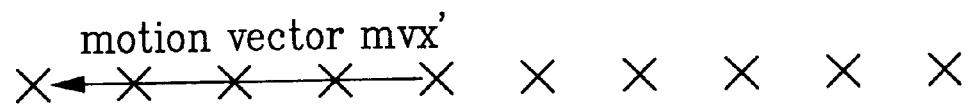

The progressive scanned image encoded into a frame picture should always be frame motion compensated, of which relative positions of vertical pels and motion vectors before and after the decimation are shown in FIG. 15. In this case, since the picture is a progressive scanned image, the picture is vertically decimated by ½ in frame units. As all the motion compensations are frame compensation, the compensation can be done by scaling down the motion vector mvy by ½ as shown in [TABLE 4]. That is, mvy'=mvy/2, and P(mvy') is a motion compensated macro block data.

TABLE 4

| | vertical frame motion vector |
| --- | --- |
| before decimation | mvy(half pel resolution) |
| after decimation | mvy' = mvy/2(¼ pel resolution) | iiii)-Field Picture

This case is identical in concepts to the ii) case when the interlace scanned image encoded into a frame picture is field motion compensated. That is, since it is an interlace scanned image and a field motion compensation, its field information is conserved as it was. Accordingly, the compensation can be done by scaling down the motion vector mvy by ½.

On the other hand, horizontal motion compensations are identical in any cases of the aforementioned vertical motion compensations. That is, as having been motion compensated in field units, the horizontal motion vector mvx' can be obtained by scaling down the horizontal motion vector mvx by ½, directly. Therefore, mvx'=mvx/2, and P(mvx') is a motion compensated macro block. If motion compensations both for horizontal and vertical directions are required, the horizontal and vertical motion compensations may be done at a time.

Figure 17:
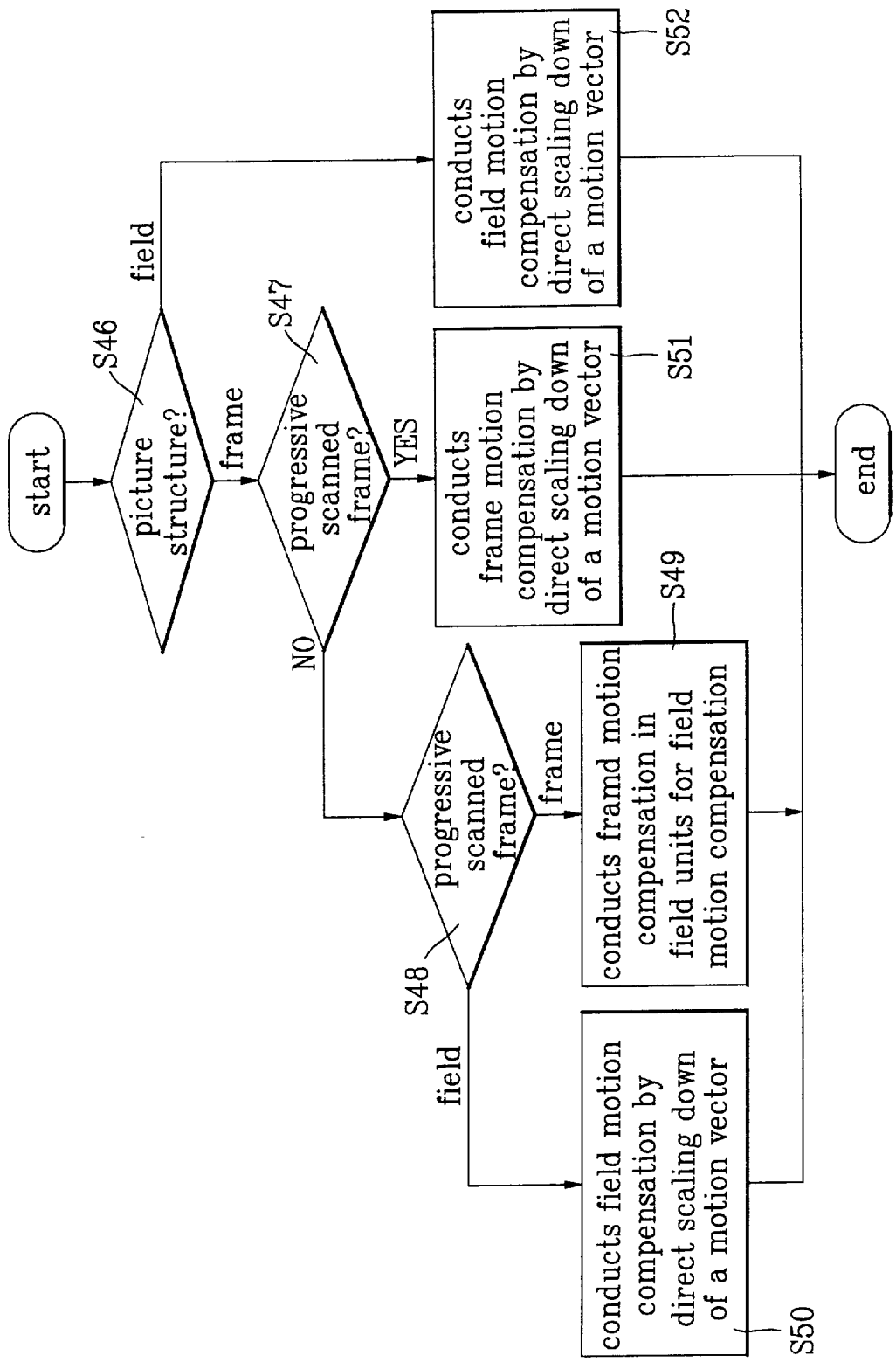
FIG. 17 illustrates a flow chart showing a process of vertical direction motion compensation in the circuit shown in FIG. 9.

FIG. 17 illustrates a flow chart showing the aforementioned process of vertical direction motion compensation.

Referring to FIG. 17, a picture structure is determined of being of field or of frame in a step S46, and, once the picture structure is determined of being of frame, the image encoded into a frame picture is determined of being an interlace scanned image or a progressive scanned image in a step S47. If the image is determined of being an interlace scanned image, a motion vector format of the image is determined of being of field or frame in a step S48. If the motion vector format is determined of being of frame in the step S48 in which a vertical decimation by ½ is conducted in field units for not losing information between fields, a vertical frame motion vector is converted into a field motion vector as in the case of i), a frame motion is divided into field unit motions, and a field motion compensation of the field unit motions is conducted in a step S49. And, if the motion vector format is determined of being of field in the step S48 in which field information is conserved as it was, the vertical motion vector is scaled down by ½ as in the case of ii) to compensate the field motion in a step S50.

On the other hand, if the image is determined of being a progressive scanned image encoded into a frame picture in the step S47 in which the image is vertically decimated by ½ in frame units, the vertical motion vector is directly scaled down by ½ as in the case of iii) and frame compensation is always conducted in a step S51. And, if the picture structure is determined of field in the step S46 in which an interlace scanned image is encoded into a field picture conserving field information as it was, the vertical motion vector is directly scaled down as in the case of the iiii) in a step S52 to compensated a field motion. The picture_structure used in the step S46 in FIG. 17 in determining a picture structure, the progressive_frame used in the step S47 in determining the image of being an interlace, or progressive scanned image, and the mv_format used in the step S48 in detenmining a motion vector format, are signals cited in the MPEG-2 video standard. That is, if the picture structure is of field, the vertical motion vector is directly scaled down by ½ to compensate the field motion, and if the picture structure is of frame while being a progressive scanned image, the vertical motion vector is directly scaled down by ½ and the frame compensation is always conducted. And, if the picture structure is of frame and an interlace scanned image while the motion vector format is of field, the vertical motion vector is directly scaled down by ½ to make a field motion compensation. And, if the picture structure is of frame and an interlace scanned image while the motion vector format is of frame, the vertical frame motion vector is converted into a field motion vector, the frame motion is divided into field unit motions, and a field motion compensation for each of the divided motions is conducted.

Figure 18:
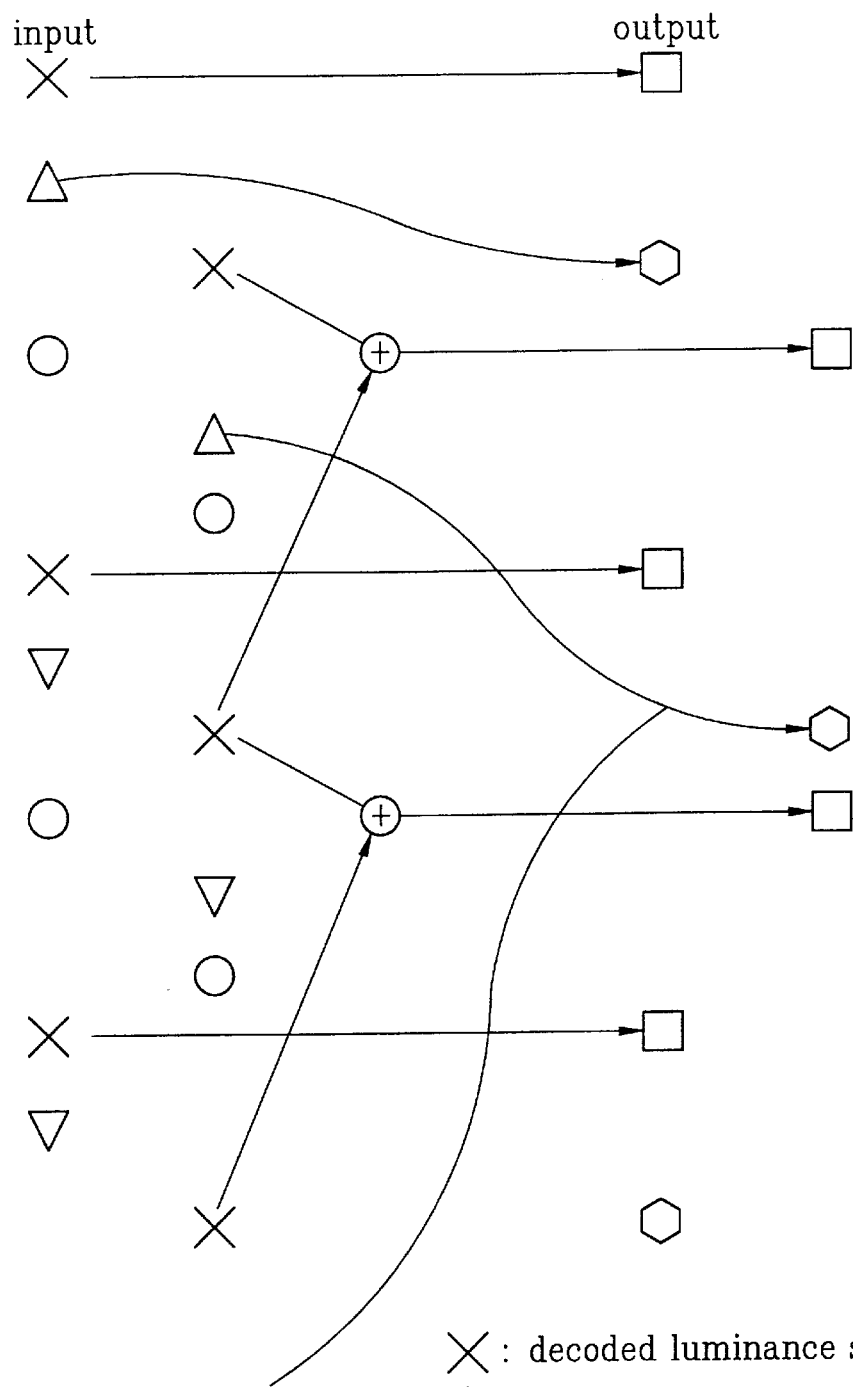
FIG. 18 illustrates a state showing a line position correcting process in the circuit shown in FIG. 9.

Once the motion vector correction is thus done according to each of the cases in the motion vector correcting part 34, the motion compensating part 35 conducts a motion compensation as shown in FIG. 17 to fit to the blocks decimated by ½ in vertical and horizontal directions respectively using such a corrected motion vector and applies 8×8 reference macro blocks to the adding part 33. The adding part 33 adds the 8×8 blocks composed of four blocks from the adaptive vertical decimating part 32 and the 8×8 reference macro blocks motion compensated in the motion compensating part 35 to restore 8×8 macro blocks. In this instant, if the macro block data decoded into 8×8 macro blocks in the adding part 33 is a B picture, the macro block data is, not stored in the frame memory 36, but applied to the multiplexer 37, and if the macro block data is I or P picture, the macro block data is, stored in the frame memory 36 and a prior I or P picture is read-in from the frame memory 36 and applied to the multiplexer 37. The multiplexer 37 selects an output from the adding part 33 if the picture type is B and an output from the frame memory 36 if the picture type is I or P, to apply directly to the VDP through the switching part 39, if the decoded picture is a progressive scanned image, and to the line position correcting part 38, if the image is an interlace scanned image, to correct odd field line positions. That is, the line position correcting part 38, which is provided for correcting line positions of an interlace scanned image into even lines and odd lines fit to a display, arranges output data employing a vertical filter. In this instant, even if intervals between even and odd fields are not regular, the irregular intervals between the even and odd fields are made regular as shown in FIG. 18, That is, in an even field, in case of a luminance signal, a decoded signal is directly produced as it was, and in case of a color signal, an weighted average of decoded adjacent color signals is produced, and in an odd field, in case of a luminance signal, an weighted average of decoded adjacent luminance signals is produced, and in case of a color signal, an weighted average of decoded adjacent color signals is produced. Accordingly, the switching part 39 presents the data from the multiplexer 37 in case the decoded picture is a progressive scanned image, and presents the data corrected in the line position correcting part 38 in case the image is an interlace scanned image. In this case, however, the HDTV video decoder of the present invention requires the line position correcting part for matching line positions of the decimated odd fields to display line positions because the line positions from the adaptive vertical decimating part does not match to the display line positions in case of an interlace scanned image, that causes an increase of hardware.

SECOND EMBODIMENT

Figure 19:
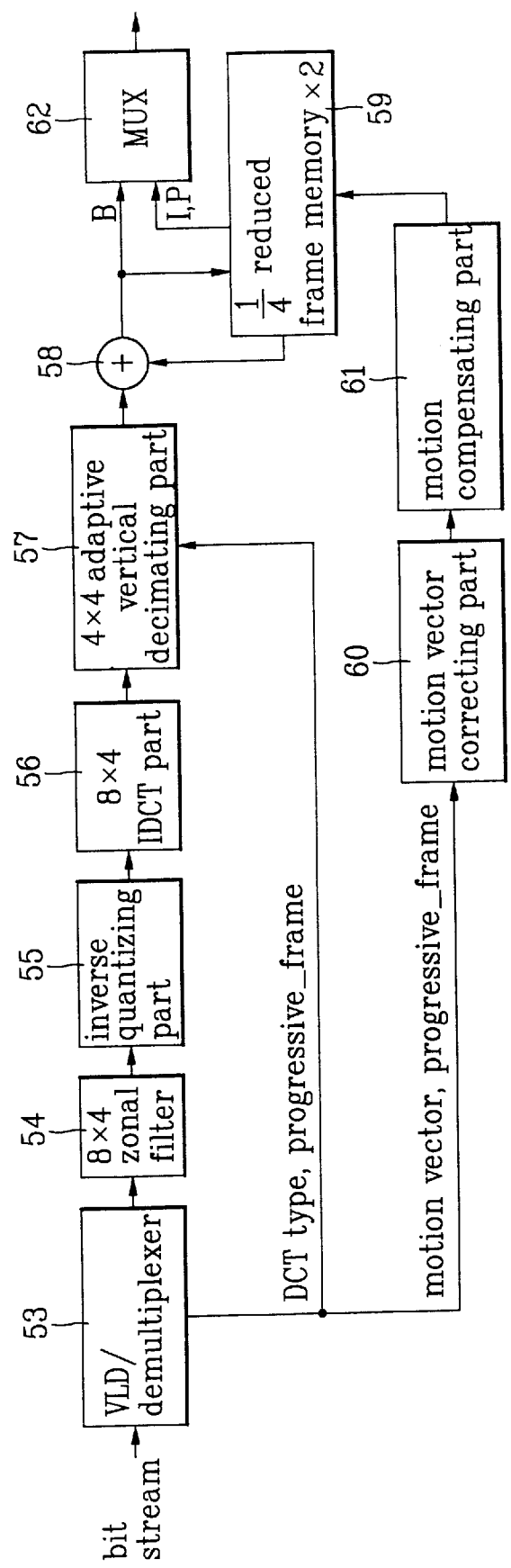
FIG. 19 illustrates a block diagram of an HDTV video decoder circuit in accordance with a second embodiment of the present invention.

FIG. 19 illustrates a block diagram of an HDTV video decoder circuit in accordance with a second embodiment of the present invention, in which an adaptive vertical decimating part removes averages of adjacent even and odd line pixels in decimating odd fields of an interlace scanned video signal in a vertical direction by ½ to produce even lines and odd lines fit to display lines, that eliminates necessity for the line position correcting part.

Referring to FIG. 19, the HDTV video decoder circuit in accordance with a second embodiment of the present invention includes a VLD/demultiplexer 53 for conducting a variable length decoding of a received bit stream to separate the bit stream into motion vectors, quantizing values and 8×8 DCT coefficients, an 8×4 zonal filter 54 for removing horizontal high frequency regions from the quantizing values and the 8×8 DCT coefficients received from the VLD/demultiplexer 53, an inverse quantizing part 55 for quantizing the 8×4 DCT coefficients from the zonal filter 54 according to the quantizing values, an IDCT part 56 for conducting an 8×4 IDCT of the quantized coefficients from the inverse quantizing part 55 to restore a video signal, an adaptive vertical decimating part 57 for vertical ½ decimation of the IDC transformed 8×4 pixels from the IDCT part 56 according to a DCT type and progressive_frame value to produce 4×4 pixels per block, a motion vector correcting part 60 for correcting the motion vector from the VLD/demultiplexer 53 according to a motion type and progressive_frame value, a motion compensating part 61 for conducting a motion compensation to match to the blocks reduced by the motion vector corrected in the motion vector correcting part 60 to produce 8×8 reference macro blocks, an adding part 58 for adding the 8×8 macro blocks composed of 4 blocks from the adaptive vertical decimating part 57 and the 8×8 reference macro blocks motion compensated in the motion compensating part 61 to restore to 8×8 macro blocks, a frame memory 59 for converting the video signal from the adding part 58 into a frame unit video signal according to picture types and storing therein, and a multiplexer 62 for selecting one from the video signals from the adding part 58 and the frame memory 59 depending on the picture types.

The operation of the HDTV video decoder circuit in accordance with a second embodiment of the present invention will be explained with reference to FIGS. 19~30.

A received HDTV bit stream is variable length decoded in the VLD/demultiplexer 53, of which resultant motion vectors are applied to the motion vector correcting part 60, and quantizing values and 8×8 DCT coefficients are removed of horizontal high frequency regions in the zonal filter 54 and selected of quantizing values and coefficients corresponding to an 8×4 pixel size. Therefore, the zonal filter 54 is composed of a macro block buffer of 8×4 pixel size. The zonal filter 54 removes the horizontal high frequency regions, but not vertical high frequency regions, in order to restore the even, and odd fields, exactly. Therefore, of the 8×8 DCT coefficients from the VLD/demultiplexer 53, the zonal filter 54 only selects coefficients for a 8×4 region and applies to the inverse quantizing part 55. Accordingly, a quantizing rate of the inverse quantizing part 55 is reduced to ½, and an IDCT unit of the IDCT part 56 becomes to change to 8×4. That is, the coefficients from the zonal filter 54 are quantized in the inverse quantizing part 55 according to the quantizing values, and 8×4 inverse discrete cosine transformed in the IDCT part 56, for being restored into a video signal. The 8×4 pixels IDC transformed in the IDCT part 56 is vertically decimated by ½ in the adaptive vertical decimating part 57 according to a DCT type and progressive frame value to produce 4×4 pixels per block. That is, in the vertical direction decimation in the adaptive vertical decimating part 57, the image is decimated in the vertical direction by ½ as shown in FIG. 20 if the image is a progressive scanned image, in which removed line positions corresponds to even line positions. And, if the image is an interlace scanned image, the decimation should be conducted for even fields and odd fields independently; in case of even lines, values on even line positions are removed as shown in FIG. 21, and in case of odd lines, averages of adjacent even lines and odd lines are removed. In case of an interlace scanned image, when the decimation is conducted for the even fields and odd fields differently, spatial phases of the fields in the decimated image become proper. That is, the adaptive vertical decimating part 57 vertically decimates horizontally ½ decimated blocks differently according to DCT types, picture structures, progressive_frames and component indices. As shown in FIGS. 8*a* and 8*b*, there are frame DCTs and field DCTs in the DCT types, and there are field pictures in which even, or odd fields compose a picture and frame pictures in which even, and odd fields together compose a picture in the picture structure.

Figure 22:
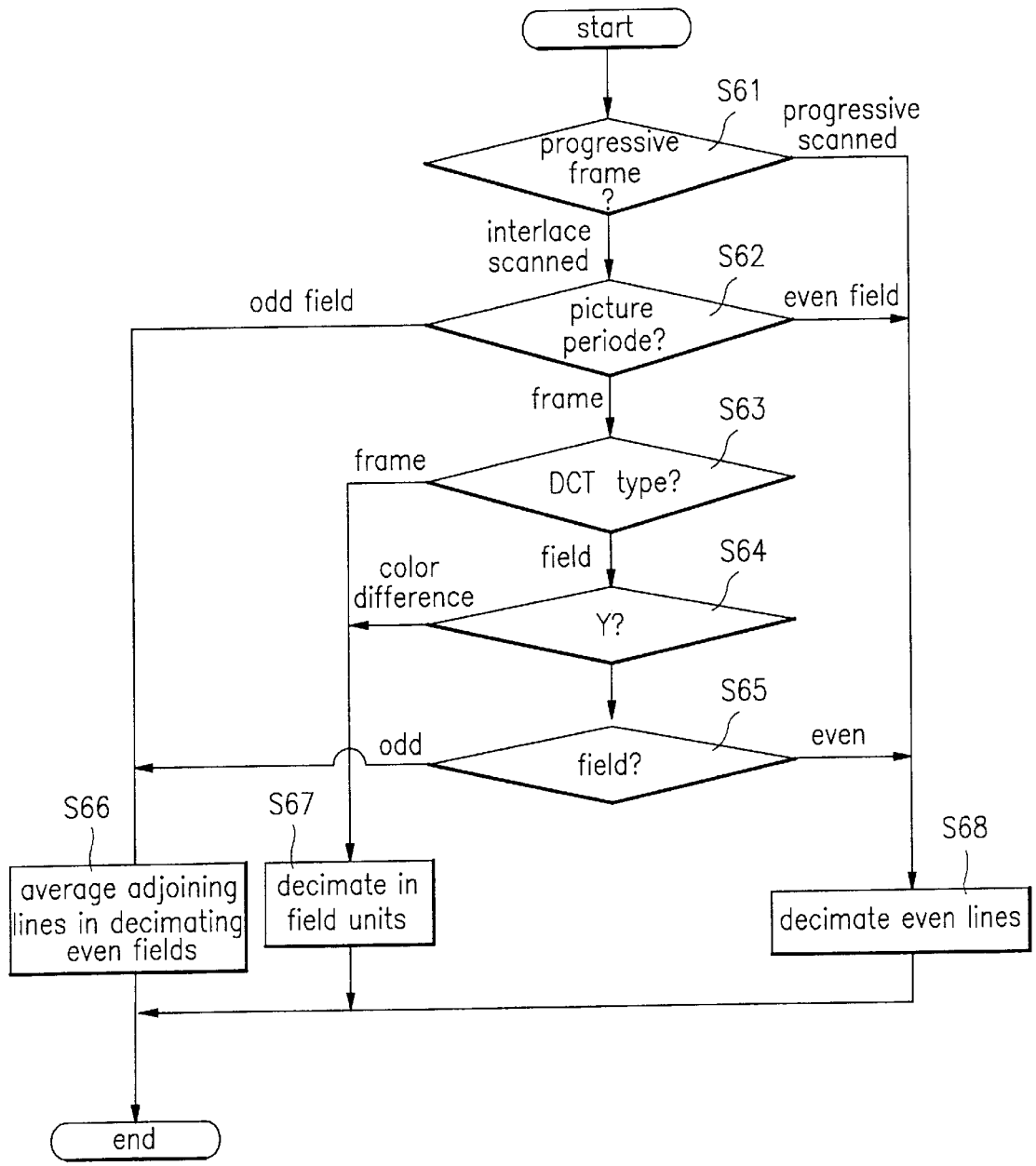
FIG. 22 illustrates a flow chart showing a process of vertical decimation in the circuit shown in FIG. 19.

FIG. 22 illustrates a flow chart showing an operation of the adaptive vertical decimating part 57.

Figure 23:
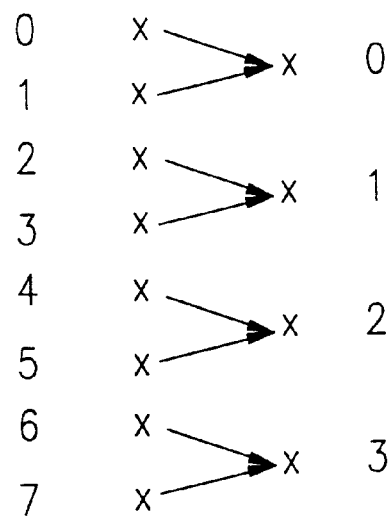
FIGS. 23 to 25 illustrate the process of vertical decimation shown in FIG. 22 in view of pixels.
Figures 25, 26:
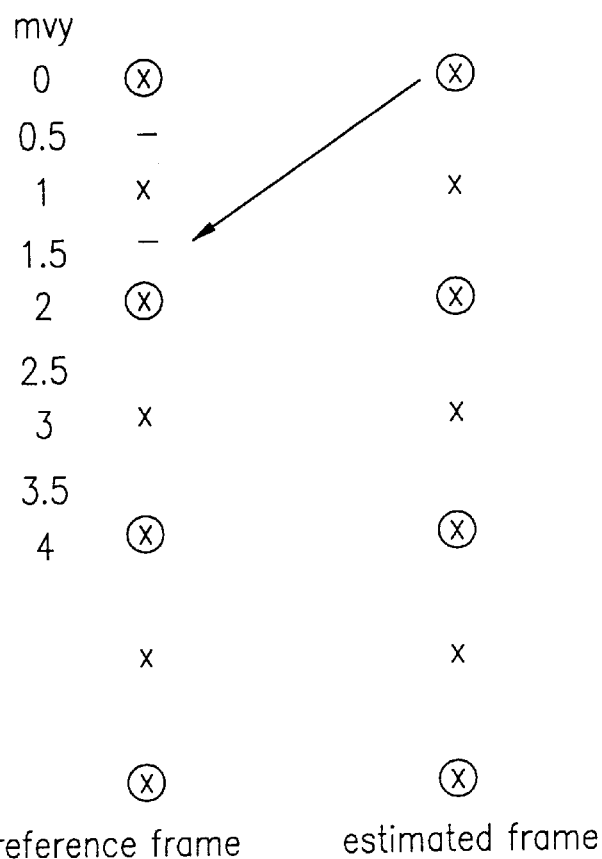
FIG. 26 illustrates the process of motion compensation of a progressive_frame in view of pixels in the circuit shown in FIG. 19.

Referring to FIG. 22, the picture structure is determined of being of frame or field in the step S61, and, if the picture structure is determined of being of field, determined of being odd field or even field. If determined of being an odd field, adjacent even and odd lines are averaged in the step S66 as shown in FIG. 23 in the decimation. If determined of being an even field, alike the even field decimation shown in FIGS. 20 and 21, only even lines are selected in the step of S68 as shown in FIG. 25 in an ½ decimation.

Figure 24:
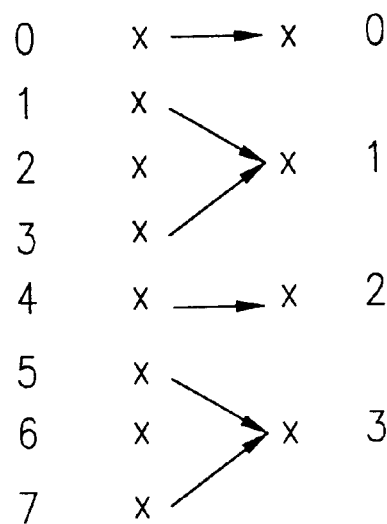

In the meantime, if the picture structure is determined of being of frame in the step S61, a progressive_frame is determined of being '1' or '0' in the step S62, i.e., determined of being a progressive scanned image or interlace scanned image. If the progressive_frame is '1', the picture structure is a progressive scanned image and if the progressive_frame is '0', the picture structure is an interlace scanned image. Therefore, if the picture structure is determined of being the progressive scanned image in the step S62, which has no separate even and odd fields with the frame structure as shown in FIG. 6, the image is decimated by ½ in the step S62 selecting even lines only as shown in FIG. 25. And, if the picture structure is determined of being the interlace scanned image in the step S62, the DCT type of the image is determined of being of frame or field in the step S63. If the DCT type is determined of being of frame in the step S63, the image is decimated in field units in order not to lose its field information as shown in FIG. 21; every other lines of the even lines are removed and every adjacent odd lines are averaged in the decimation. If the DCT type is determined of being of field in the step S63, the picture is determined of being of a luminance signal or a color signal in the step S64. If the picture is determined of being of a color signal in the step S64, as shown in FIG. 24, every other lines of the even lines are removed and every adjacent odd lines are averaged in the decimation. If the picture is determined of being of a luminance signal in the step S64, the field is determined of being an even field or odd field in the step S65. If the field is determined of being an odd field in the step S65, as shown in FIG. 23, even lines and odd lines adjoining each other are averaged in the decimation. And, if the field is determined of being an odd field in the step S65, as shown in FIG. 25, only even lines are selected in the step S68 in decimating the image by ½.

Thus, the adaptive vertical decimating part 57 averages even lines and odd lines adjoining each other in the decimation as shown in FIG. 23 if the picture structure of the image is an even field, the picture structure is of frame and an interlace scanned image and of an odd filed while the DCT type is of field and the picture is of a luminance signal. The adaptive vertical decimating part 57 removes every other lines for even lines and averages every adjacent two odd lines for odd lines in the decimation as shown in FIG. 24 in case the picture structure is of frame and the DCT type is of frame while being an interlace scanned image, or the picture structure is of frame and the DCT type is of field and the picture is of a color signal while being an interlace scanned image. And, the adaptive vertical decimating part 57 selects even lines only in the decimation as shown in FIG. 25 in case the picture structure is an even field, or the image is a progressive scanned image while the picture structure is of frame, the picture structure is of frame while being an interlace scanned image and the DCT type is of field and the picture is of a luminance signal while being an even field.

In the meantime, a horizontal image ½ decimated while passing through the VLD/demultiplexer 53, the zonal filter 54, the inverse quantizing part 55 and the IDCT part 56 is subjected to a ¼ pel resolution motion compensation using the horizontal motion vector scaled down in the horizontal direction in the motion compensating part 61. A vertical image ½ decimated while passing through the VLD/demultiplexer 53, the zonal filter 54, the inverse quantizing part 55, the IDCT part 56 and the adaptive vertical decimating part 57 is subjected to a ¼ pel resolution motion compensation using the vertical motion vector scaled down in the vertical direction in the motion compensating part 61.

The operation of the motion compensating part 61 will be explained in more detail with reference to FIGS. 26~30.

Since the decoded lines in the progressive_frame correspond to the even lines of an original picture, in which a distance between each of the decoded lines is 2 and the resolution of an original motion vector is half pel size, in a motion compensation of the progressive_frame, the three interposed points between the decoded lines as shown in FIG. 26 can be reference frames. Therefore, as shown in FIG. 27, the two least significant bits of a motion vector represent a vertical interposed point, and the most significant bit represents a relative distance of lines.

On the other hand, as an interlace scanned image has even fields and odd fields and, as shown in FIG. 19, has its odd fields corrected to be matched to the display lines, when there are motion compensations between fields in a field picture, the interlace scanned image should be corrected of its motion vectors. If a reference field and an estimated field are on the same parity, though the motion vector correction is done if the motion vector is scaled down by ½, if the reference field and the estimated field are on fields of which parities are different from each other, the motion vector should be corrected as shown in FIG. 28. That is, a ±0.5 should be added to an original motion vector, and [TABLE 5] shows respective corrected value.

TABLE 5

| reference field | estimated field | mvy' |
|---|---|---|
| even field | even field | mvy' |
| even field | odd field | mvy + 0.5 |
| odd field | even field | mvy − 0.5 |
| odd field | odd field | mvy |

Figure 29:
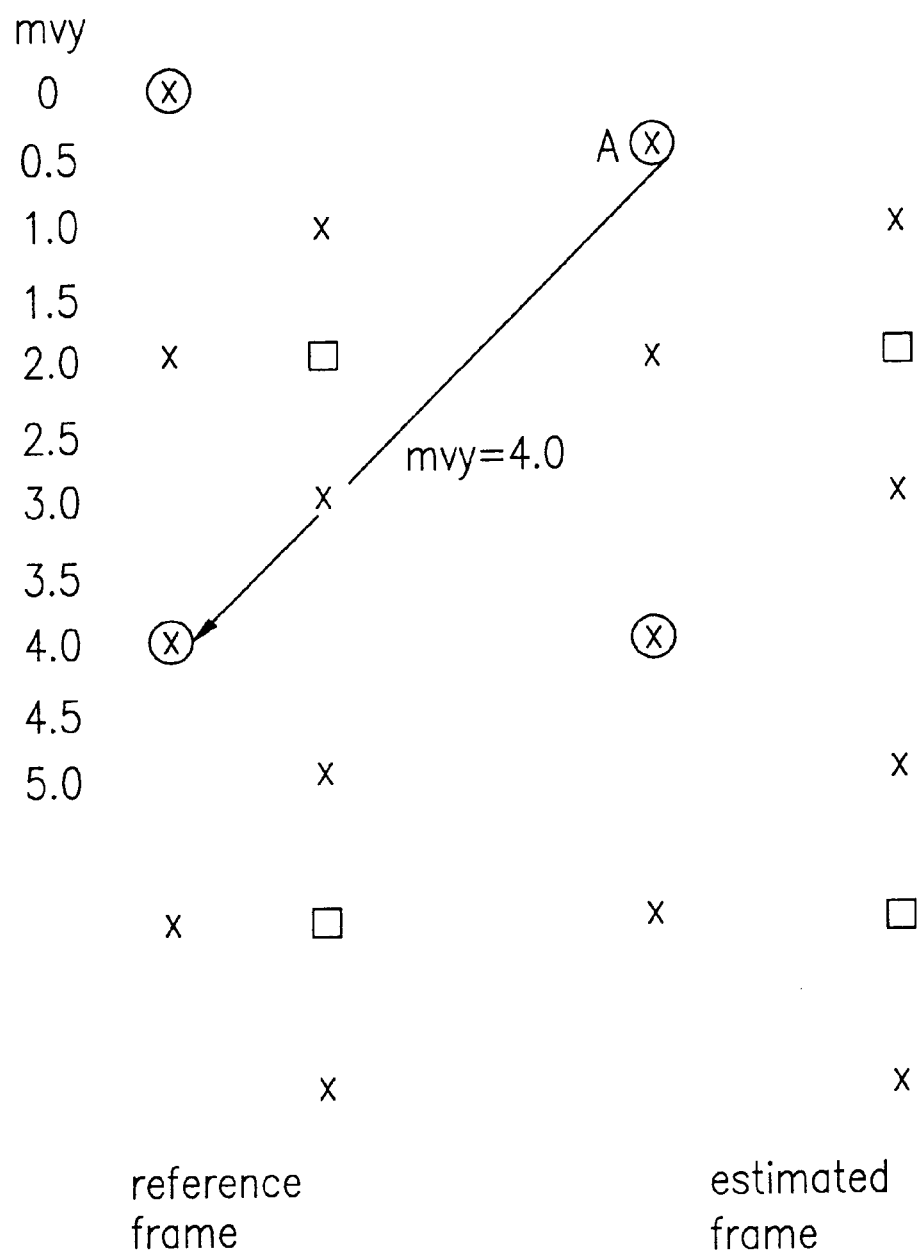
FIG. 29 illustrates a process of motion compensation of the mode frame based in the interlace scanned frame in view of pixels in the circuit shown in FIG. 19; and, FIG. 30 illustrates a process of motion compensation of the mode frame based in the interlace scanned frame in view of pixels in the circuit shown in FIG. 19.
Figure 30:
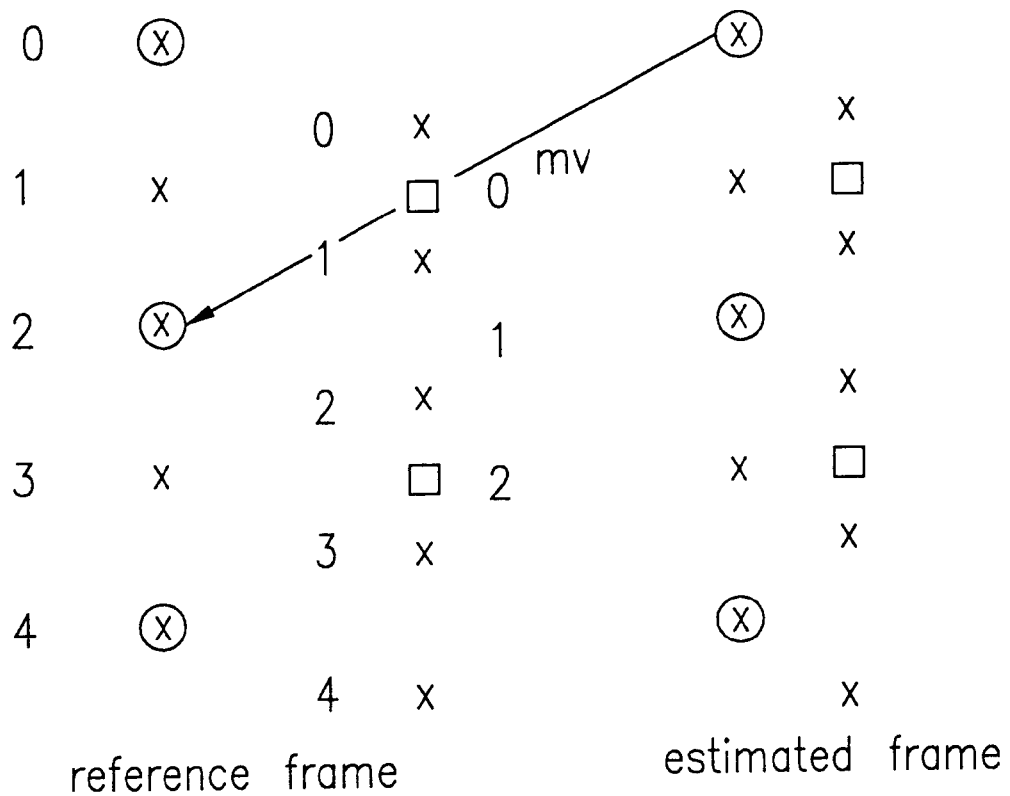

On the other hand, in case of an interlace frame, there are two modes of the motion compensation. If it is a field based mode, all motion vectors can be compensated with the same manner after motion vector corrections as shown in FIG. 28, if it is a frame based mode, the process should be different depending on motion vectors. Because, in case of a frame structure in the frame based mode, a motion compensation in which a mix of even fields and odd fields can be prevented should be conducted. As shown in FIG. 29, a reference frame for a point A is different depending on a vertical motion vector mvy; if the vertical motion vector mvy is half pel, in which a motion vector value of the reference frame is a value having the even line and odd line interpolated, the frame motion compensation should be processed in a manner as shown in FIG. 26, directly. If the vertical motion vector is an even number dividable by 2 without any remainder, which indicates the fields are on the same parity, the frame motion compensation can be done in a manner as shown in FIG. 28 for each of the even fields and odd fields after dividing the motion vectors by 2.

However, for cases other than the aforementioned, which are motion compensations between fields in parities different from each other, the frame motion vectors should be corrected with respective field motion vectors. In order to make a correction of the frame motion vector with the motion vector between parities different from each other, a correction as shown in [TABLE 6] is performed after which field motion compensations as shown in FIG. 28 are conducted for each of the even fields and odd fields.

TABLE 6

| reference field | estimated field | mvy' |
|---|---|---|
| even field | even field | mvy/2 |
| odd field | even field | mvy/2 − 0.5 |
| even field | odd field | mvy/2 + 0.5 |
| odd field | odd field | mvy/2 |

Once the motion vector compensating part 60 thus conducts motion vector compensation according to each of the cases, the motion compensating part 61 makes motion compensation to fit to the blocks ½ decimated in the horizontal and vertical directions respectively using the motion vector corrected as above to produce and apply 8×8 reference blocks to the adding part 58. The adding part 58 adds the 8×8 blocks composed of 4 blocks from the adaptive vertical decimating part 57 and the 8×8 reference blocks motion compensated in the motion compensating part 61 to restore 8×8 macro blocks. In this case, if a macro block data 8×8 decoded in the adding part 58 is of B picture, the data is, not stored in the frame memory 59, but applied to the multiplexer 62 directly, and if the data is of I or P picture, the data is stored in the frame memory 59 while a prior I or P picture is read in from the frame memory 59 and applied to the multiplexer 62. The multiplexer 62 selects an output from the adding part 58 if the picture type is B, and selects an output from the frame memory 59 and presents to the VDP if the picture type is I or P. Therefore, only with a ¼ frame memory size, an MPEG-2 video bit stream can be decoded to allow obtaining an image decoded in horizontal and vertical directions by ½ for a progressive scanned picture or a interlace scanned picture.

As has been explained, in comparison to a conventional MPEG-2 video decoder which uses a 4×4 IDCT that requires ¼ frame memory in encoding an interlace scanned image into frame picture only to lose field information of the image resulting in a significant damage to the picture quality, the HDTV video decoder circuit of the present invention facilitates to maintain the field information as it was resulting in an improvement in the picture quality while requiring a ¼ size frame memory. Accordingly, the present invention is cost competitive because it has applications to low cost MPEG-2 decoders, and, particularly, to substantially low cost video decoders, without use of conventional HDTV videos in reception of low resolution TV, such as SDTV, or NTSC TV for high definition images such as HDTV.

It will be apparent to those skilled in the art that various modifications and variations can be made in the device and method for decoding an HDTV video of the present invention without departing from the spirit or scope of the invention. Thus, it is intended that the present invention cover the modifications and variations of this invention provided they come within the scope of the appended claims and their equivalents.

What is claimed is:

1. A device for decoding an HDTV video comprising:
    horizontal decimating means for analyzing a motion vector and a coded structure of an image from a received video signal and for decimating the video signal in a horizontal direction;
    decompression means for inverse quantizing the data received from the horizontal decimating means and for conducting 8×4 IDCT of the quantized data;
    vertical decimating means for receiving the analyzed coded structure of the image and for decimating the data processed by decompression means in a vertical direction according to the analyzed coded structure of the image;
    means for receiving the motion vector and correcting the received motion vector based on the analyzed coded structure of the image; and
    restoring means for conducting a motion compensation of the horizontally and vertically decimated image using the corrected motion vector to restore an original image.

2. An HDTV video decoder circuit comprising:
    a VLD/demultiplexer for conducting a variable length decoding of a received bit stream to separate motion vectors, quantizing values, and 8×8 DCT coefficients;
    an 8×4 zonal filter for removing horizontal high frequency regions from the quantizing values and the 8×8 DCT coefficients received from the VLD/demultiplexer;
    an inverse quantizing part for quantizing the 8×4 DCT coefficients from the zonal filter according to the quantizing values;
    an IDCT part for conducting an 8×4 IDCT of the quantized coefficients from the inverse quantizing part to restore a video signal;
    an adaptive vertical decimating part for decimating an odd field of an interlace scanned image signal with the odd field matched to a display line position to produce 4×4 pixels per block in a vertical decimation of the IDC transformed 8×4 pixels from the IDCT part according to a DCT type and a progressive_frame value;
    a motion vector correcting part for correcting the motion vector from the VLD/demultiplexer according to the motion vector value and progressive_frame value;
    a motion compensating part for conducting a motion compensation of 8×8 reference macro blocks to match to the blocks reduced by the motion vector corrected in the motion vector correcting part;
    an adding part for adding the 8×8 macro blocks composed of 4 blocks from the adaptive vertical decimating part and the 8×8 reference macro blocks motion compensated in the motion compensating part to restore 8×8 macro blocks;
    a frame memory for converting the video signal decimated by ½ in horizontal and vertical directions respectively in the adding part into a frame unit video signal according to B, I, P picture types and storing therein; and,
    a multiplexer for selecting an output from the adding part if it is a B picture, and selecting the video signal from the frame memory if it is I or P picture.

3. An HDTV video decoder circuit as claimed in claim 2, wherein the adaptive vertical decimating part removes averages of even lines and odd lines adjoining each other in case the image is an interlace scanned image of odd fields.

4. An HDTV video decoder circuit as claimed in claim 2, wherein the adaptive vertical decimating part averages even lines and odd lines adjoining each other in the decimation if the picture_structure is of frame, the image is an interlace scanned image, the DCT type is of field, the picture is of a luminance signal, and the field is odd fields.

5. An HDTV video decoder circuit as claimed in claim 2, wherein, if the picture_structure is of frame, the image is an interlace scanned image, and the DCT type is of frame, the adaptive vertical decimating part removes every other lines for even lines in the decimation and averages every adjacent two odd lines for odd lines in the decimation.

6. An HDTV video decoder circuit as claimed in claim 2, wherein, if the picture_structure is of frame, the image is an interlace scanned image, and the DCT type is of field, and the picture is of a color difference signal, the adaptive vertical decimating part removes every other lines for even lines in the decimation and averages every adjacent two odd lines for odd lines in the decimation.

7. An HDTV video decoder circuit as claimed in claim 2, wherein, if the picture_structure is of frame and the image is a progressive scanned image, the adaptive vertical decimating part removes data on even lines in the decimation.

8. An HDTV video decoder circuit as claimed in claim 2, wherein, if the picture_structure is of frame, the image is an interlace scanned image, and the DCT type is of field, the picture is of a luminance signal, and the field is even field, the adaptive vertical decimating part removes data on even lines in the decimation.

9. An HDTV video decoder circuit as claimed in claim 2, wherein the motion vector correcting part and the motion compensating part conduct a ¼ pel resolution motion compensation of a decimated horizontal image employing a horizontal motion vector corrected by horizontal scaling down.

10. An HDTV video decoder circuit as claimed in claim 2, wherein the motion vector correcting part and the motion compensating part conduct a ¼ pel resolution motion compensation of a vertically decimated image employing a vertical motion vector corrected by vertical scaling down.

11. An HDTV video decoder circuit as claimed in claim 2, wherein the motion vector correcting part and the motion compensating part correct a vertical motion vector by vertical scaling down of the vertical motion vector if a reference field and an estimated field of the interlace scanned image are on the same parity.

12. An HDTV video decoder circuit as claimed in claim 2, wherein the motion vector correcting part and the motion compensating part does not correct a vertical motion vector if a reference field of an interlace scanned image is an even field and an estimated field of the interlace scanned image is an odd field.

13. An HDTV video decoder circuit as claimed in claim 2, wherein the motion vector correcting part and the motion compensating part correct a vertical motion vector by adding 0.5 to the vertical motion vector in a motion compensation if a reference field of an interlace scanned image is an even field and an estimated field of the interlace scanned image is an odd field.

14. An HDTV video decoder circuit as claimed in claim 2, wherein the motion vector correcting part and the motion compensating part correct a vertical motion vector by subtracting 0.5 from the vertical motion vector in a motion compensation if a reference field of an interlace scanned image is an odd field and an estimated field of the interlace scanned image is an even field.

15. An HDTV video decoder circuit as claimed in claim 2, wherein the motion vector correcting part and the motion compensating part conduct a ¼ pel resolution motion compensation employing a vertical motion vector corrected by vertical scaling down if an interlace_frame is a field based mode.

16. An HDTV video decoder circuit as claimed in claim 2, wherein the motion vector correcting part and the motion compensating part conduct a ¼ pel resolution motion compensation employing a vertical motion vector corrected by vertical scaling down if an interface_frame is a frame based mode and half pel.

17. An HDTV video decoder circuit as claimed in claim 2, wherein the motion vector correcting part and the motion compensating part conduct motion vector correction by dividing a vertical motion vector by 2 and adding/subtracting 0.5 thereto/therefrom for even field and odd field respectively in the motion compensation between fields of the same parity if an interlace_frame is in a frame based mode.

18. An HDTV video decoder circuit as claimed in claim 2, wherein the motion vector correcting part and the motion compensating part correct a frame motion vector into a field motion vector in the motion compensation between fields of different parities if an interlace_frame is in a frame based mode.

19. An HDTV video decoder circuit as claimed in claim 2, further comprising:
  a line position correcting part for correcting line positions of an odd field of an interlace scanned image signal from the multiplexer into display line positions; and,
  a switching part for selectively presenting an image in response to a selecting signal whether a received image is an interlace scanned image or a progressive scanned image.

20. An HDTV video decoder circuit as claimed in claim 19, wherein the selecting signal is provided from the vertical decimating part.

21. An HDTV video decoder circuit as claimed in claim 19, wherein the selecting signal selects an image from the line position correcting part if the image from the multiplexer is an interlace scanned image and selects an image from the multiplexer if the image from the multiplexer is a progressive scanned image.

22. A method for decoding an HDTV video comprising:
  (1) analyzing a motion vector and a coded structure of a received video signal, and decimating the video signal in a horizontal direction with reference to the analysis to restore the video signal;
  (2) inverse quantizing the data decimated in horizontal direction and conducting 8×4 IDCT of the quantized data;
  (3) receiving the analyzed coded structure of the image and decimating the processed 8×4 IDCT data in the vertical direction with reference to the analyzed coded structure;
  (4) correcting a received motion vector value with reference to the motion vector and the analyzed coded structure of a video; and
  (5) conducting a motion compensation using the horizontally/vertically decimated video and a respective motion vector value to restore an original image.

23. A method as claimed in claim 22, wherein step (2) includes:
  determining the received image of being the progressive scanned image or the interlace scanned image;
  determining a picture-structure of the received image if the received image is determined of being the interlace scanned image; and
  determining a DCT type of the image in case the determined picture_structure is a frame picture, and, if the DCT type is a frame DCT type, classifying even fields and odd fields and removing data on even line positions for each of the classified fields.

24. A method as claimed in claim 23, where, if the DCT type is determined of being a field DCT type, the method further comprises:
   determining the picture of being of a luminance signal or a color difference signal,
   removing data on even line positions if the picture is of the luminance signal, to decimate the image in the vertical direction by ½, and
   classifying even fields and odd fields and removing data on even line position for each of the classified fields if the picture is of the color difference signal, to decimate the image in the vertical direction by ½.

25. A method as claimed in claim 23, further including removing data on even line positions in case the received image is a progressive scanned image and the picture_structure is a field picture, to decimate the image in the vertical direction by ½.

26. A method for decoding an HDTV video comprising:
   (1) analyzing a coded structure of a received video signal, and decimating the video signal in a horizontal direction with reference to the analysis to restore the video signal;
   (2) receiving the analyzed coded structure of the image and decimating the restored image that was decimated in the horizontal direction in the vertical direction with reference to the analyzed coded structure;
   (3) correcting a received motion vector value with reference to the motion vector and the analyzed coded structure of a video; and
   (4) conducting a motion compensation using the horizontally/vertically decimated video and a respective motion vector value to restore an original image, wherein step (2) includes:
      determining a picture-structure of the received image of being of frame or field, and, if determined of being of field, determining of the field being an even field or an odd field,
      averaging even lines and odd lines adjoining each other if the field is determined of being the odd field to decimate the received image by ½, and selecting even lines only if the field is determined of being the even field to decimate the received image by ½, and
      determining the received image of being a progressive scanned image or an interlace scanned image if the picture-structure is determined of being of frame, and determining a DCT type of the image if the image is determined of being the interlace scanned image,
      decimating the image in field units if the DCT type is determined of being a frame DCT type, and determining the picture of being of a luminance signal or a color difference signal if the DCT type is determined of being a field DCT type and decimating the image in field units if the picture is determined of being of the color difference signal, and
      determining a field of the image of being an odd field or an even field if the picture is determined of being of the luminance signal, and, if the field is determined of being the even field, decimating the image of an image only of even lines and, if the field is determined of being the odd field, decimating the image by averaging adjoining even lines and odd lines.

27. A method as claimed in claim 26, further including the decimating image by only removing even lines only if the received image is a progressive scanned image.

28. A method as claimed in claim 22, wherein correcting the received motion vector value includes:
   determining a picture_structure of the received image of being of frame or of field, directly scaling down the motion vector if the picture_structure is of the field to make a motion compensation in field units, an determining the image of being a progressive scanned image or an interlace scanned image if the picture_structure is of the frame,
   directly scaling down the motion vector of the image is the progressive scanned image to make a motion compensation in frame units, an determining a format of the motion vector of being formatted in frame units or field units if the image is the interlace scanned image, and
   conducting a field motion compression in field units if the format of the motion vector is of frame, and conducting the field motion compensation by directly scaling down the motion vector if the format of the motion vector is of field.

29. The device recited by claim 1, wherein the horizontal decimating means decimate the video signal in the horizontal direction before the vertical decimating means decimate in the vertical direction.

30. The method recited by claim 22, wherein the video signal is decimated in the horizontal direction before being decimated in the vertical direction.

31. A method for decimating an HDTV video comprising:
   analyzing a coded structure of a video signal, and decimating the video signal in a horizontal direction with reference to the analysis to restore the video signal; and
   receiving the analyzed coded structure of the video signal, and decimating the restored video signal in a vertical direction with reference to the analyzed coded structure.

32. The device recited by claim 1, wherein the decompression means includes:
   an inverse quantizing part for quantizing 8×4 DCT coefficients of the data received from the horizontal decimating means; and
   an IDCT part for conducting an 8×4 IDCT of the quantized coefficients from the inverse quantizing part.

33. A method for decoding an HDTV video image comprising:
   analyzing, a coded structure of an input bit stream;
   decimating the input bit stream corresponding to the HDTV video image in the horizontal direction to generate horizontally decimated data;
   decompressing the horizontally decimated data to generate decompressed data;
   decimating the decompressed data in the vertical direction according to the analyzed coded structure of the video image and generating vertically decimated data; and
   decoding a resolution signal from the vertically decimated data.

* * * * *